(12) United States Patent
Namie

(10) Patent No.: US 11,630,426 B2
(45) Date of Patent: Apr. 18, 2023

(54) CONTROL SYSTEM AND NON-TRANSITORY COMPUTER READABLE RECORDING MEDIUM

(71) Applicant: OMRON Corporation, Kyoto (JP)

(72) Inventor: Masaki Namie, Takatsuki (JP)

(73) Assignee: OMRON Corporation, Kyoto (JP)

( * ) Notice: Subject to any disclaimer, the term of this patent is extended or adjusted under 35 U.S.C. 154(b) by 90 days.

(21) Appl. No.: 17/437,848

(22) PCT Filed: Mar. 6, 2020

(86) PCT No.: PCT/JP2020/009710
§ 371 (c)(1),
(2) Date: Sep. 10, 2021

(87) PCT Pub. No.: WO2020/189343
PCT Pub. Date: Sep. 24, 2020

(65) Prior Publication Data
US 2022/0171351 A1   Jun. 2, 2022

(30) Foreign Application Priority Data
Mar. 20, 2019   (JP) .............................. JP2019-052751

(51) Int. Cl.
*G05B 13/04* (2006.01)
*G05B 17/02* (2006.01)
*G05B 19/401* (2006.01)

(52) U.S. Cl.
CPC ........... *G05B 13/048* (2013.01); *G05B 17/02* (2013.01); *G05B 19/401* (2013.01)

(58) Field of Classification Search
CPC ...... G05B 15/02; G05B 13/048; G05B 17/02; G05B 19/401
See application file for complete search history.

(56) References Cited

U.S. PATENT DOCUMENTS 9,261,344 B2 * 2/2016 Brenner ................. G01B 5/012
2009/0292503 A1 * 11/2009 Hon ........................ B23Q 17/22
702/168

(Continued)

FOREIGN PATENT DOCUMENTS

CN       85105481 A  *  1/1987  ......... G05B 19/4015
CN      101279431 A  * 10/2008  ........... G05B 19/401
(Continued)

OTHER PUBLICATIONS

"International Search Report (Form PCT/ISA/210) of PCT/JP2020/009710", dated Jun. 2, 2020, with English translation thereof, pp. 1-4.

(Continued)

*Primary Examiner* — Ronald D Hartman, Jr.
(74) *Attorney, Agent, or Firm* — JCIPRNET

(57) ABSTRACT

A measurement sensor is integrated with a control object so that a position separated from a processing object by the control object along a target trajectory is a measurement point. A control device includes: a first generator that generates a first command position of the control object on a plane; a first control part that generates a first operation amount using a model predictive control; a second generator that generates a second command position of the control object on an orthogonal axis that is orthogonal to the plane; and a second control part that generates a second operation amount using the model predictive control. The second generator generates the second command position so that the distance between the control object and the surface of an object is constant, based on the measurement result of the measurement sensor and the first command position.

7 Claims, 16 Drawing Sheets

(56) References Cited

U.S. PATENT DOCUMENTS

| | | | | |
|---|---|---|---|---|
| 2010/0030368 | A1* | 2/2010 | Hon | G01B 5/20 |
| | | | | 700/195 |
| 2014/0249772 | A1* | 9/2014 | Sprenger | G01B 21/045 |
| | | | | 702/152 |
| 2018/0106586 | A1* | 4/2018 | Gruber | G01B 21/045 |

FOREIGN PATENT DOCUMENTS

| | | | | | |
|---|---|---|---|---|---|
| CN | 112008496 | A | * | 12/2020 | B23Q 17/22 |
| EP | 3291032 | | | 3/2018 | |
| EP | 3432102 | | | 1/2019 | |
| JP | H0569280 | A | * | 3/1993 | B23Q 17/22 |
| JP | H1190787 | A | * | 4/1999 | B23Q 17/20 |
| JP | 2004298697 | | | 10/2004 | |
| JP | 2007152261 | | | 6/2007 | |
| JP | 2012079358 | A | * | 4/2012 | B23Q 17/22 |
| JP | 2016061631 | A | * | 4/2016 | G01B 21/20 |
| JP | 2018151889 | | | 9/2018 | |
| WO | WO-9527184 | A1 | * | 10/1995 | G01B 11/005 |
| WO | WO-2005031254 | A1 | * | 4/2005 | G01B 21/04 |

OTHER PUBLICATIONS

"Written Opinion of the International Searching Authority (Form PCT/ISA/237) of PCT/JP2020/009710", dated Jun. 2, 2020, with English translation thereof, pp. 1-6.

Urbano Nunes et al., "Sensor-Based 3-D Autonomous Contour-Following Control", Proceedings of the International Conference on Intelligent Robots and Systems (IROS), Sep. 1994, pp. 172-179.

"Search Report of Europe Counterpart Application", dated Nov. 14, 2022, pp. 1-6.

* cited by examiner

```
FOR j=i to DNC
    IF CX(i) + Ladv >= CX(j) &&  CX(i) + Ladv < CX(j+1)
        rj = j + (CX(i) + Ladv - CX(j))/(CX(j+1) - CX(j))
        IF jp != 0
            FOR jj=jp+1 to j
                CZ(jj) = MZP + (MZ - MZP)/(rj - rjp)* (jj - rjp)
            END
        END
        jp = j
        rjp = rj
        MZP = MZ
        BREAK
    END
END
```

FIG. 6

|  | CX | MZ | CZ |
|---|---|---|---|
| Control cycle No. | X-axis command position [mm] | Calculated value (measurement distance-desired clearance) [mm] | Z-axis command position [mm] |
| 0 | 0 | 0 | 0 |
| 1 | 2.96E-05 | 1.49E-06 | 0 |
| 2 | 0.000235984 | 1.19E-05 | 0 |
| 3 | 0.000794667 | 3.99E-05 | 0 |
| 4 | 0.00187944 | 9.45E-05 | 0 |
| 5 | 0.003662551 | 0.000184081 | 0 |
| 6 | 0.006314667 | 0.000317376 | 0 |
| 7 | 0.010004872 | 0.000502847 | 0 |
| ... | ... | ... | ... |
| 73 | 9.656586601 | 0.480608064 | 0 |
| 74 | 10.03221228 | 0.498942846 | 0.001621498 |
| 75 | 10.41666667 | 0.517598148 | 0.020955529 |
| 76 | 10.81000981 | 0.536684769 | 0.040722468 |
| 77 | 11.21230018 | 0.556132343 | 0.06095064 |
| ... | ... | ... | ... |
| 450 | 506.25 | 0.312849913 | -0.188176915 |
| 451 | 507.75 | 0.3870765 | -0.113014012 |
| 452 | 509.25 | 0.460751085 | -0.037689852 |
| 453 | 510.75 | 0.533772847 | 0.037687207 |
| 454 | 512.25 | 0.606034177 | 0.113011372 |
| 455 | 513.75 | 0.67743619 | 0.18817428 |
| 456 | 515.25 | 0.747873662 | 0.263070443 |
| ... | ... | ... | ... |

FIG. 8

CONTROL SYSTEM AND NON-TRANSITORY COMPUTER READABLE RECORDING MEDIUM

CROSS-REFERENCE TO RELATED APPLICATION

This application is a 371 application of the International PCT application serial no. PCT/JP2020/009710, filed on Mar. 6, 2020, which claims the priority benefit of Japan Patent Application No. 2019-052751, filed on Mar. 20, 2019. The entirety of each of the above-mentioned patent applications is hereby incorporated by reference herein and made a part of this specification.

TECHNICAL FIELD

The technology relates to a control system and a control program.

RELATED ART

Japanese Laid-open No. 2004-298697 (Patent Document 1) discloses a coating method in which a die head for coating liquid discharging is brought sufficiently close to a substrate even if the substrate has undulations on its surface, and a uniform coating film is formed on the substrate. The coating method includes a process of measuring the shape of the surface of the substrate before coating, and a process of, based on a measurement result of the shape, adjusting a distance between the die head for coating liquid discharging and the substrate and moving the die head for coating liquid discharging in accordance with the shape of the surface of the substrate.

PRIOR-ART DOCUMENTS

Patent Documents

Patent Document 1: Japanese Laid-open No. 2004-298697

SUMMARY OF THE INVENTION

Problems to be Solved by the Invention

In Patent Document 1, the die head for coating liquid discharging is moved up and down in accordance with the shape of the surface of the substrate while the die head for coating liquid discharging is moved in a direction parallel to the substrate. Hence, a mechanism for moving the die head for coating liquid discharging in the direction parallel to the substrate and a mechanism for moving the die head for coating liquid discharging up and down are controlled to be linked with each other.

In the case where such two mechanisms are linked with each other to operate, a difference in control response delay between the two mechanisms becomes a problem. However, Patent Document 1 does not consider the difference in control response delay between the two mechanisms. When there is a difference in control response delay between the two mechanisms, the die head serving as a control object becomes unable to accurately follow the shape of the surface of the substrate serving as an object. Particularly, in the case where the undulations on the surface of the object have a large gradient, or where the control object has a high moving speed, the control object becomes unable to accurately follow the shape of the surface of the object.

The present disclosure has been made in view of the above issues, and an object thereof is to provide a control system and a control program making it possible for a control object to accurately follow the shape of a surface of an object.

Means for Solving the Problems

According to one example of the present disclosure, a control system includes: a control object, executing a predetermined processing on a surface of an object; a measurement sensor, measuring a distance to a measurement point on the surface of the object; multiple drive devices, for changing a relative positional relationship between the object and the control object; and a control device, outputting an operation amount to the multiple drive devices every control cycle. The multiple drive devices include: a first drive device, for moving the control object relative to the object along a target trajectory on a plane facing the surface of the object; and a second drive device, for moving the control object relative to the object along an orthogonal axis orthogonal to the plane. The measurement sensor is integrated with the control object so that a position separated by a predetermined distance along the target trajectory from a processing object point to be subjected to the predetermined processing by the control object serves as the measurement point. The control device includes a first generator, a first control part, a second generator, and a second control part. The first generator generates a first command position of the control object on the plane in each control cycle based on the target trajectory. The first control part generates a first operation amount output to the first drive device by model predictive control using a first dynamic characteristic model showing a relationship between the first operation amount and a position of the control object on the plane and the first command position. The second generator generates a second command position of the control object on the orthogonal axis in each control cycle. The second control part generates a second operation amount output to the second drive device by model predictive control using a second dynamic characteristic model showing a relationship between the second operation amount and a position of the control object on the orthogonal axis and the second command position. Based on a measurement result of the measurement sensor and the first command position, the second generator generates the second command position so that a distance between the control object and the surface of the object is constant.

According to this disclosure, the control device performs movement control on the control object by model predictive control. At this time, the second command position in each control cycle is generated based on the measurement result of the measurement sensor. As a result, the control object is able to accurately follow the shape of the surface of the object.

In the above disclosure, a distance from the first command position of a present control cycle to the first command position of a control cycle belonging to a prediction horizon is shorter than the predetermined distance.

According to this disclosure, the second command position in the prediction horizon can be calculated by interpolation. As a result, an error between the trajectory shape of the second command position and the surface shape of the object can be reduced, and by model predictive control, the control object is able to accurately follow the surface shape of the object.

In the above disclosure, the measurement sensor measures the distance every predetermined measurement cycle. The second generator, for a control cycle corresponding to the first command position located between the position of the control object on the plane when the measurement point in a previous measurement cycle is set as the processing object point and the position of the control object on the plane when the measurement point in a present measurement cycle is set as the processing object point, generates the second command position by interpolation calculation using a measurement result in the previous measurement cycle and a measurement result in the present measurement cycle. According to this disclosure, the second command position can be accurately calculated by interpolation.

In the above disclosure, the measurement cycle is shorter than the control cycle. According to this disclosure, accuracy of the interpolation calculation can be improved, and an error between a movement trajectory of the control object and the surface shape of the object can further be reduced.

In the above disclosure, the first drive device moves the control object relative to the object along a first axis on the plane. The first command position indicates a position on the first axis. The first dynamic characteristic model indicates a relationship between the first operation amount and the position of the control object on the first axis. The multiple drive devices further include a third drive device for moving the control object relative to the object along a second axis on the plane that is different from the first axis. The control device further includes: a third generator, generating a third command position of the control object on the second axis in each control cycle based on the target trajectory; and a third control part, generating a third operation amount output to the third drive device by model predictive control using a third dynamic characteristic model showing a relationship between the third operation amount and the position of the control object on the second axis and the third command position. The second generator generates the second command position based on the third command position in addition to the measurement result of the measurement sensor and the first command position.

According to this disclosure, the control object is able to move to an arbitrary position on the plane facing the surface of the object in accordance with the first command position and the third command position. At this time, the second command position on the above orthogonal axis in each control cycle is generated based on the measurement result of the measurement sensor and the first command position and the third command position. As a result, the control object is able to accurately follow the shape of the surface of the object.

According to one example of the present disclosure, a control program realizes a control device of a control system, the control system including: a control object, executing a predetermined processing on a surface of an object; a measurement sensor, measuring a distance to a measurement point on the surface of the object; multiple drive devices, for changing a relative positional relationship between the object and the control object; and the control device, outputting an operation amount to the multiple drive devices every control cycle. The multiple drive devices include: a first drive device, for moving the control object relative to the object along a target trajectory on a plane facing the surface of the object; and a second drive device, for moving the control object relative to the object along an orthogonal axis orthogonal to the plane. The measurement sensor is integrated with the control object so that the measurement point is located in a position separated by a predetermined distance along the target trajectory from a processing object point to be subjected to the predetermined processing by the control object. The control program causes a computer to execute a first to fourth steps. The first step is a step of generating a first command position of the control object on the plane in each control cycle based on the target trajectory. The second step is a step of generating a first operation amount output to the first drive device by model predictive control using a first dynamic characteristic model showing a relationship between the first operation amount and a position of the control object on the plane and the first command position. The third step is a step of generating a second command position of the control object on the orthogonal axis in each control cycle. The fourth step is a step of generating a second operation amount output to the second drive device by model predictive control using a second dynamic characteristic model showing a relationship between the second operation amount and a position of the control object on the orthogonal axis and the second command position. The third step includes a step of, based on a measurement result of the measurement sensor and the first command position, generating the second command position so that a distance between the control object and the surface of the object is constant.

According to this disclosure, the control object is also able to accurately follow the shape of the surface of the object.

Effects of the Invention

According to the present disclosure, the control object is able to accurately follow the shape of the surface of the object.

BRIEF DESCRIPTION OF THE DRAWINGS

FIG. 6 illustrates one example of a source code of a program for generating a command position CZ on the Z-axis.

FIG. 8 illustrates one example of time series data of the command position CX on the X-axis, a calculated value MZ calculated from a measurement distance MD, and the command position CZ on the Z-axis.

DESCRIPTION OF THE EMBODIMENTS

Figure 1:
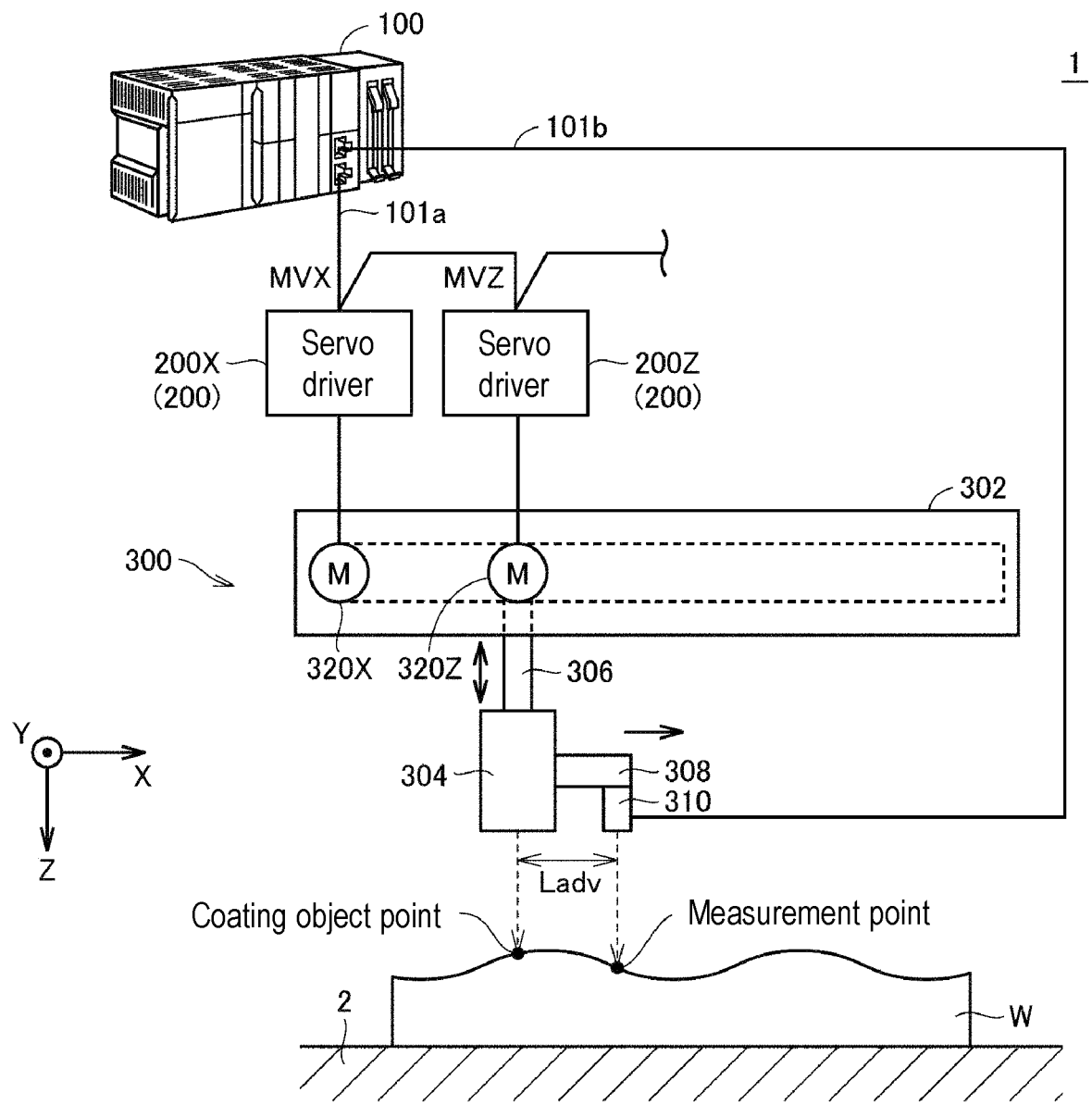
FIG. 1 is a schematic diagram showing a configuration example of a control system in which a control device according to the present embodiment is applied.

Embodiments of the present invention are described in detail with reference to the drawings. Moreover, the same or equivalent parts in the drawings are denoted by the same reference numerals, and descriptions thereof will not be repeated.

§ 1 Application Example

First of all, one example of a situation in which the present invention is applied is described with reference to FIG. 1 and FIG. 2. FIG. 1 is a schematic diagram showing a configuration example of a control system in which a control device according to the present embodiment is applied. A control system 1 of the example shown in FIG. 1 is a system in which a coating liquid is applied to a surface of an object (hereinafter referred to as "workpiece W"). The control system 1 includes a coating device 300, multiple servo drivers 200, and a control device 100. However, the control system is not limited to the example shown in FIG. 1, and may be any system in which some processing (such as laser processing and inspection image capturing) is executed on the surface of the workpiece W. In the case of performing laser processing on the surface of the workpiece W, a laser processing machine is provided instead of the coating device 300; in the case of performing inspection image capturing on the surface of the workpiece W, an imaging device is provided instead of the coating device 300. The workpiece W of the example shown in FIG. 1 is a substrate and is placed at a predetermined position on a stage 2. The stage 2 may be a part of a conveyance device conveying the workpiece W.

Hereinafter, a thickness direction of the workpiece W is taken as a Z-axis direction, and two axes orthogonal to the Z-axis are taken as the X-axis and the Y-axis.

The coating device 300 is a device applying the coating liquid to the surface of the workpiece W. The coating device 300 includes a main body 302 installed in a fixed position, a coating head 304 applying the coating liquid, a connection part 306 connecting the coating head 304 with the main body 302, and servomotors 320X and 320Z. The servomotor 320X moves the connection part 306 and the coating head 304 along the X-axis on an XY plane facing the surface of the workpiece W. The servomotor 320Z moves the connection part 306 and the coating head 304 along the Z-axis orthogonal to the XY plane.

The coating device 300 applies the coating liquid from the coating head 304 to the surface of the workpiece W while moving the coating head 304 in an X-axis direction (here, the positive direction of the X-axis).

Further, the coating device 300 includes a measurement sensor 310 measuring a distance to a measurement point on the surface of the workpiece W. The measurement sensor 310 is integrated with the coating head 304 so that a position on the surface of the workpiece W, which is separated from a coating object point being a coating object of the coating head 304 by a predetermined advance distance Lady in the positive direction of the X-axis, serves as the measurement point. Specifically, the measurement sensor 310 is attached to a connection part 308 extending in the positive direction of the X-axis from the coating head 304.

The foot of a perpendicular drawn from a tip of the measurement sensor 310 to the Z-axis coincides with the foot of a perpendicular drawn from a tip of the coating head 304 to the Z-axis. Hence, a measured value obtained by the measurement sensor 310 indicates a distance from the tip of the measurement sensor 310 to the measurement point on the surface of the workpiece W, and also indicates a distance from the tip of the coating head 304 to the coating object point on the surface of the workpiece W when the coating head 304 is moved the advance distance Lady in the positive direction of the X-axis.

The measurement sensor 310 measures the distance to the measurement point every predetermined measurement cycle, and transmits the measurement distance MD to the control device 100.

The multiple servo drivers 200 are drive devices for changing a relative positional relationship between the workpiece W and the coating head 304, and include servo drivers 200X and 200Z. The servo drivers 200X and 200Z are provided corresponding to the servomotors 320X and 320Z, respectively, and drive the corresponding servomotors. That is, the servo driver 200X drives the servomotor 320X, and moves the coating head 304 along a target trajectory (here, a trajectory in the positive direction of the X-axis) on the XY plane facing the surface of the workpiece W. Accordingly, the coating head 304 moves relative to the workpiece W along the X-axis direction. The servo driver 200Z drives the servomotor 320Z, and moves the coating head 304 along the Z-axis orthogonal to the XY plane. Accordingly, the coating head 304 moves relative to the workpiece W along the Z-axis direction.

Based on a command value (command position or command speed) from the control device 100 and a feedback value from the corresponding servomotors, the servo drivers 200X and 200Z generate a drive signal for the corresponding servomotors. By outputting the generated drive signal to the corresponding servomotors, the servo drivers 200X and 200Z drive the corresponding servomotors.

For example, the servo drivers 200X and 200Z receive an output signal as the feedback value from an encoder coupled to a rotary shaft of the corresponding servomotors. From the feedback value, the position, rotation phase, rotational speed, cumulative number of revolutions and the like of the servomotors can be detected.

The control device 100 is connected to the multiple servo drivers 200 and the measurement sensor 310, and controls the multiple servo drivers 200 based on the measurement distance MD of the measurement sensor 310. Specifically, the control device 100 outputs the operation amounts MVX and MVZ to the servo drivers 200X and 200Z, respectively, and performs movement control to move the coating head 304. Data containing the operation amounts MVX and MVZ can be exchanged between the control device 100 and the servo drivers 200X and 200Z. Data containing the measurement distance MD can be exchanged between the control device 100 and the measurement sensor 310.

FIG. 1 shows a configuration example in which the control device 100 and the servo drivers 200X and 200Z are communicatively connected via a fieldbus 101*a*. Also shown is a configuration example in which the control device 100 and the measurement sensor 310 are communicatively connected via a fieldbus 101*b*. However, the communication form is not limited to such a configuration example, and any communication form can be adopted if an algorithm as described below is realized. For example, the control device 100 and the servo drivers 200X and 200Z may be directly connected to each other by a signal line.

The control device 100 generates the operation amounts MVX and MVZ to be respectively output to the servo drivers 200X and 200Z, by model predictive control every predetermined control cycle. The control device 100 outputs the generated operation amounts MVX and MVZ as command values (command position or command speed) to the servo drivers 200X and 200Z, respectively.

Based on the target trajectory, the control device 100 generates a first command position of the coating head 304 on the X-axis for each control cycle. By model predictive control using a first dynamic characteristic model showing a relationship between the operation amount MVX and the position of the coating head 304 on the X-axis and the first command position, the control device 100 generates the operation amount MVX to be output to the servo driver 200X.

The control device 100 generates a second command position of the coating head 304 on the Z-axis for each control cycle. By model predictive control using a second dynamic characteristic model showing a relationship between the operation amount MVZ and the position of the coating head 304 on the Z-axis and the second command position, the control device 100 generates the operation amount MVZ to be output to the servo driver 200Z.

Based on the measurement distance MD of the measurement sensor 310 and the first command position, the control device 100 generates the second command position so that a distance between the coating head 304 and the surface of the workpiece W is constant.

In this way, the control device 100 performs movement control on the coating head 304 by model predictive control. At this time, the second command position on the Z-axis for each control cycle is generated based on the measurement distance MD of the measurement sensor 310. As a result, the coating head 304 is able to accurately follow the shape of the surface of the workpiece W.

§ 2 Specific Example

Next, a specific example of the control device 100 according to the present embodiment is described.

<A. Hardware Configuration Example of Control Device>

As one example, the control device 100 according to the present embodiment may be implemented using a programmable controller (PLC). In the control device 100, processing as described later may be realized by a processor executing a pre-stored control program (including a system program and a user program as described later).

Figure 2:
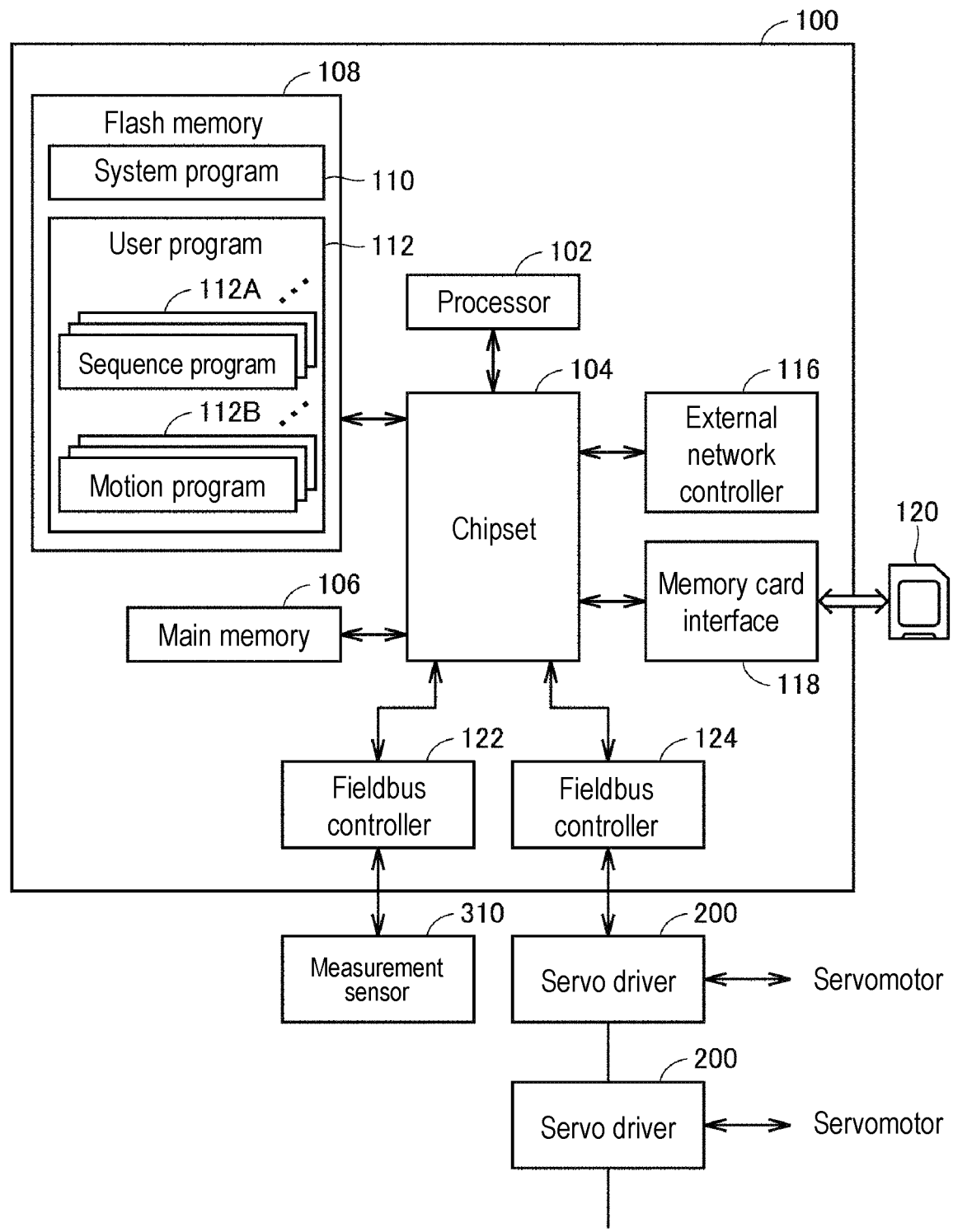
FIG. 2 is a schematic diagram showing one example of a hardware configuration of a control device according to the present embodiment.

FIG. 2 is a schematic diagram showing one example of a hardware configuration of the control device 100 according to the present embodiment. As shown in FIG. 2, the control device 100 includes: a processor 102 such as a central processing unit (CPU) or a microprocessing unit (VIPU), a chipset 104, a main memory 106, a flash memory 108, an external network controller 116, a memory card interface 118, and fieldbus controllers 122 and 124.

The processor 102 reads a system program 110 and a user program 112 stored in the flash memory 108, and develops and executes the same on the main memory 106, thereby realizing arbitrary control over a control object. By the processor 102 executing the system program 110 and the user program 112, processing related to output of an operation amount to the servo driver 200, data communication via a fieldbus or the like as described later is executed.

The system program 110 includes an order code for providing basic functions of the control device 100, such as data input/output processing or control of execution timing. The user program 112 is arbitrarily designed according to the control object, and includes a sequence program 112A for executing sequence control and a motion program 112B for executing motion control. In the user program 112, by defining a function block, processing and functions according to the present embodiment are realized. A function block is a component of a program executed by the control device 100, meaning a modularized program element to be used multiple times.

The chipset 104 realizes processing of the control device 100 as a whole by controlling each component.

The fieldbus controller 122 is an interface for data exchange with various devices connected to the control device 100 through a fieldbus. As one example of such devices, the measurement sensor 310 is connected to the control device 100. A measured value received from the measurement sensor 310 by the fieldbus controller 122 is stored in a storage device such as the flash memory 108.

The fieldbus controller 124 is an interface for data exchange with various devices connected to the control device 100 through a fieldbus. As one example of such devices, the servo driver 200 is connected to the control device 100.

The fieldbus controllers 122 and 124 are capable of giving an arbitrary command to a connected device and acquiring arbitrary data (including a measured value) managed by the device. The fieldbus controller 122 also functions as an interface for data exchange with the measurement sensor 310. The fieldbus controller 124 also functions as an interface for data exchange with the servo driver 200.

The external network controller 116 controls data exchange through various wired/wireless networks. The memory card interface 118 is configured to allow a memory card 120 to be mounted thereon and removed therefrom, making it possible to write data to and read data from the memory card 120.

<B. Servo Driver>

Figure 3:
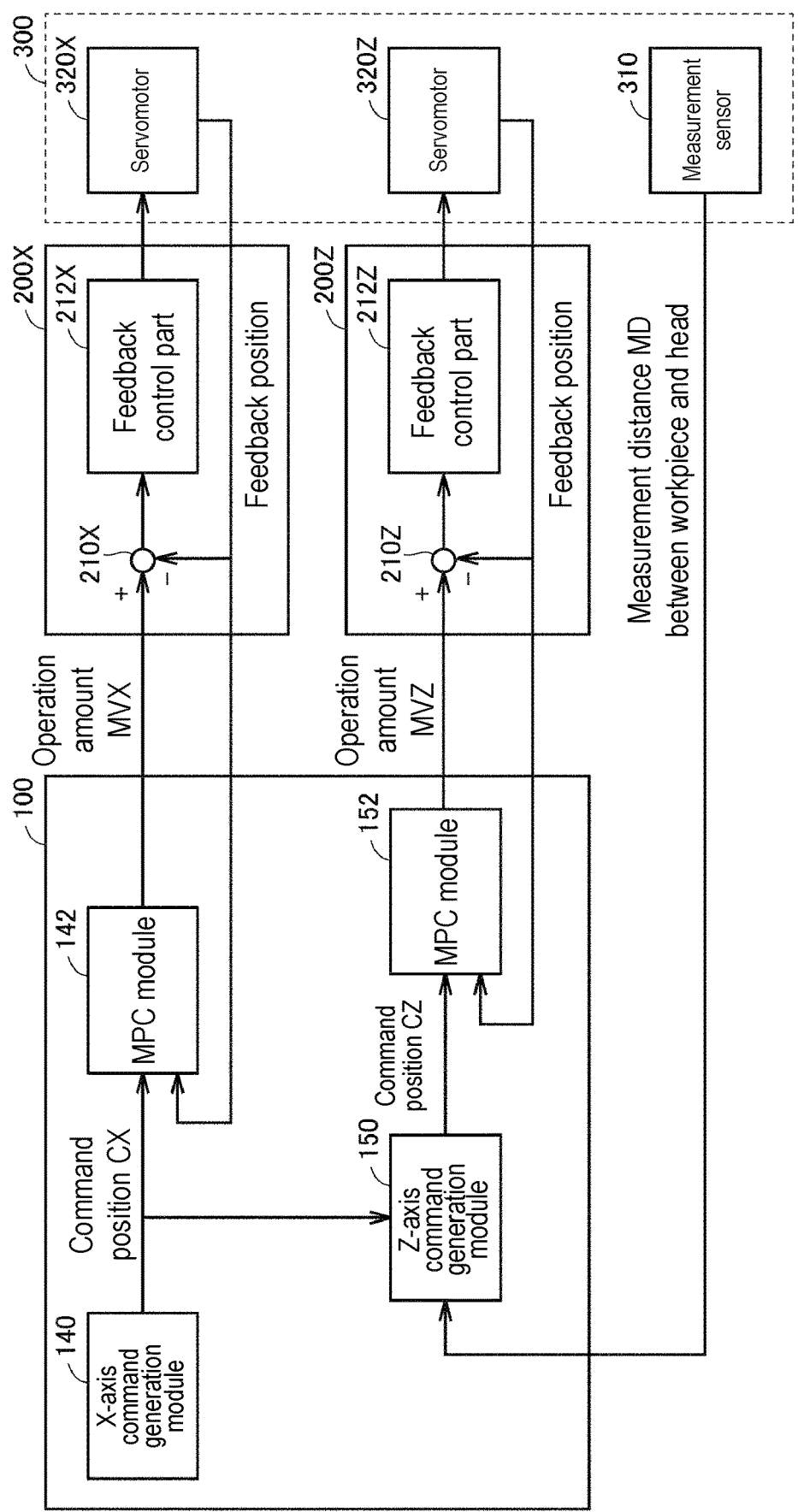
FIG. 3 is a schematic diagram showing one example of a functional configuration of a servo driver and a control device according to the present embodiment.

FIG. 3 is a schematic diagram showing one example of a functional configuration of a servo driver and a control device according to the present embodiment. As shown in FIG. 3, the servo drivers 200X and 200Z respectively include subtractors 210X and 210Z and feedback control parts 212X and 212Z.

The subtractor 210X receives the operation amount MVX as the command value (command position or command speed) from the control device 100, and also receives an output signal as the feedback value from an encoder coupled to the servomotor 320X. Similarly, the subtractor 210Z receives the operation amount MVZ as the command value (command position or command speed) from the control device 100, and also receives an output signal as the feedback value from an encoder coupled to the servomotor 320Z. The subtractors 210X and 210Z calculate a deviation between the command value and the feedback value received.

The feedback control parts 212X and 212Z respectively execute control operations according to the deviation output from the subtractors 210X and 210Z. The feedback control parts 212X and 212Z execute a control operation according to a position control loop and a speed control loop in the case where the operation amount received from the control device 100 is a command position. The feedback control parts 212X and 212Z execute a control operation according to a speed control loop in the case where the operation amount received from the control device 100 is a command speed.

In the control operation according to a position control loop, a command speed corresponding to a position deviation between a measurement position of the servomotor obtained from the feedback value and a command position given by the control device 100 is calculated.

In the control operation according to a speed control loop, a torque value corresponding to a speed deviation between a command speed and a measurement speed of the servomotor obtained from the feedback value is calculated. The feedback control parts 212X and 212Z output to the servomotor a current command for generating torque of the calculated torque value.

<C. Functional Configuration Example of Control Device>

As shown in FIG. 3, the control device 100 includes an X-axis command generation module 140, a Z-axis command generation module 150, and model predictive control modules 142 and 152. In the figure, model predictive control is referred to as "MPC."

The X-axis command generation module 140 generates the first command position (hereinafter referred to as "command position CX") of the coating head 304 on the X-axis for each control cycle in accordance with the target trajectory that is created in advance. The X-axis command generation module 140 outputs the generated command position CX to the model predictive control module 142 and the Z-axis command generation module 150.

The X-axis command generation module 140 generates time series data of the command position CX from the target trajectory, and reads the command position CX for each control cycle from the time series data. Alternatively, the control device 100 may store in advance the time series data of the command position CX that define the target trajectory.

In this case, the X-axis command generation module 140 may access the time series data of the command position CX stored in advance. In this way, the command position CX for each control cycle may be sequentially calculated from the target trajectory in accordance with a predetermined calculation formula, or may be stored in advance in the form of time series data.

Based on the measurement distance MD from the measurement sensor 310 and the command position CX, the Z-axis command generation module 150 generates the second command position (hereinafter referred to as "command position CZ") of the coating head 304 on the Z-axis for each control cycle so that the distance between the coating head 304 and the surface of the workpiece W is constant. A specific method for generating the command position CZ is to be described later.

By the model predictive control using the first dynamic characteristic model showing the relationship between the operation amount MVX and the position of the coating head 304 on the X-axis and the command position CX, the model predictive control module 142 generates the operation amount MVX to be output to the servo driver 200X. The model predictive control module 142 generates the operation amount MVX so that the position of the coating head 304 on the X-axis coincides with the command position CX.

By the model predictive control using the second dynamic characteristic model showing the relationship between the operation amount MVZ and the position of the coating head 304 on the Z-axis and the command position CZ, the model predictive control module 152 generates the operation amount MVZ to be output to the servo driver 200Z. The model predictive control module 152 generates the operation amount MVZ so that the position of the coating head 304 on the Z-axis coincides with the command position CZ.

The first dynamic characteristic model and the second dynamic characteristic model are created by prior tuning. A dynamic characteristic model is created based on an input value (operation amount) and an output value (measurement position of the coating head 304) obtained in the tuning.

The first dynamic characteristic model and the second dynamic characteristic model are expressed by, for example, a function $P(z^{-1})$ below. The function $P(z^{-1})$ is a discrete time transfer function in which a dead time element and an n-th order lag element are combined. In a dynamic characteristic model expressed by the function $P(z^{-1})$, dead time d as the dead time element as well as variables $a_1$ to an and variables $b_1$ to $b_m$ as the n-th order lag element are determined as model parameters. The dead time is a time (that is, delay time from input to output) from when an input value is given until when an output corresponding to the input value appears. The optimum values may also be determined for the order n and the order m.

$$P(z^{-1}) = z^{-d} \frac{b_1 z^{-1} + b_2 z^{-2} + \ldots + b_m z^{-m}}{1 + a_1 z^{-1} + a_2 z^{-2} + \ldots + a_n z^{-n}} \quad \text{[Expression 1]}$$

Such model parameter creation processing (that is, system identification) may be executed by the least squares method or the like.

Specifically, each value of the model parameters defining the first dynamic characteristic model is determined so that an output y when the operation amount MVX is given to the variable u of $y=P(z^{-1})*u$ coincides with the measurement position of the coating head 304 on the X-axis (that is, to minimize the error). Similarly, each value of the model parameters defining the second dynamic characteristic model is determined so that the output y when the operation amount MVZ is given to the variable u of $y=P(z^{-1})*u$ coincides with the measurement position of the coating head 304 on the Z-axis (that is, to minimize the error).

In the case where vibration of the coating head 304 is negligibly small, the position of the coating head 304 on the X-axis and the position of the servomotor 320X have a one-to-one relationship. Hence, a dynamic characteristic model showing the relationship between the operation amount MVX and the position of the servomotor 320X may also be used as the first dynamic characteristic model. Similarly, in the case where vibration of the coating head 304 is negligibly small, the position of the coating head 304 on the Z-axis and the position of the servomotor 320Z have a one-to-one relationship. Hence, a dynamic characteristic model showing the relationship between the operation amount MVZ and the position of the servomotor 320Z may also be used as the second dynamic characteristic model.

Model predictive control is a control for generating an operation amount so that the position of the control object (here, the coating head 304) in a prediction horizon coincides with the target trajectory. For example, a change amount of control amount of the control object required for causing the position of the control object in the prediction horizon to coincide with the target trajectory is determined, and an operation amount for generating the change amount in the output of a dynamic characteristic model is calculated. A known method may be adopted as the model predictive control.

<D. Specific Example of Generation of Command Position CZ>

Figure 4:
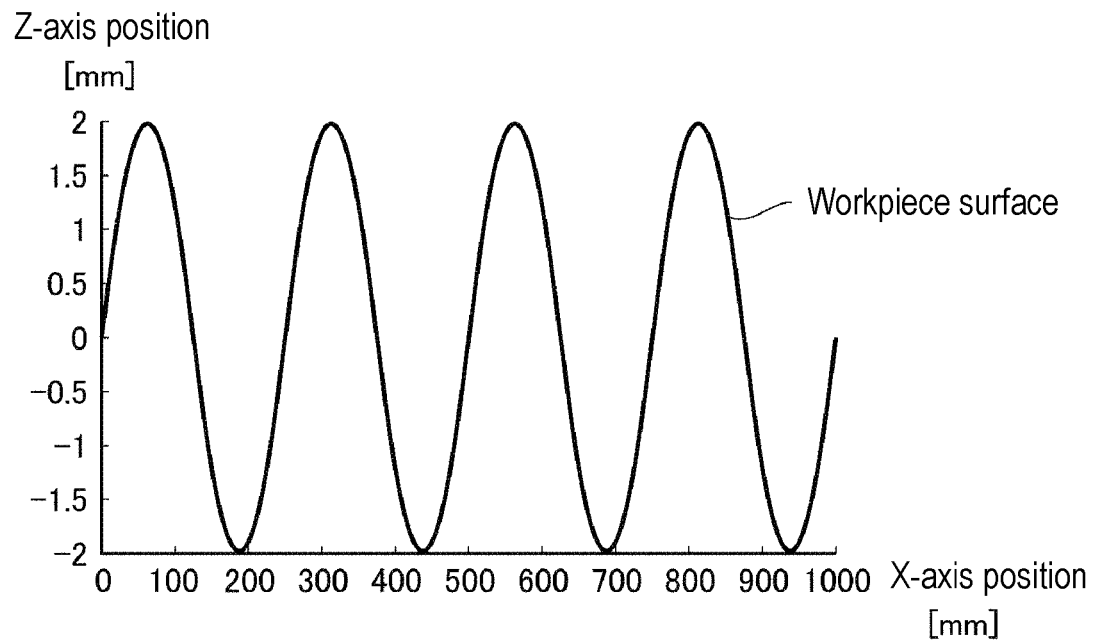
FIG. 4 illustrates one example of the surface shape of a workpiece W.
Figure 5:
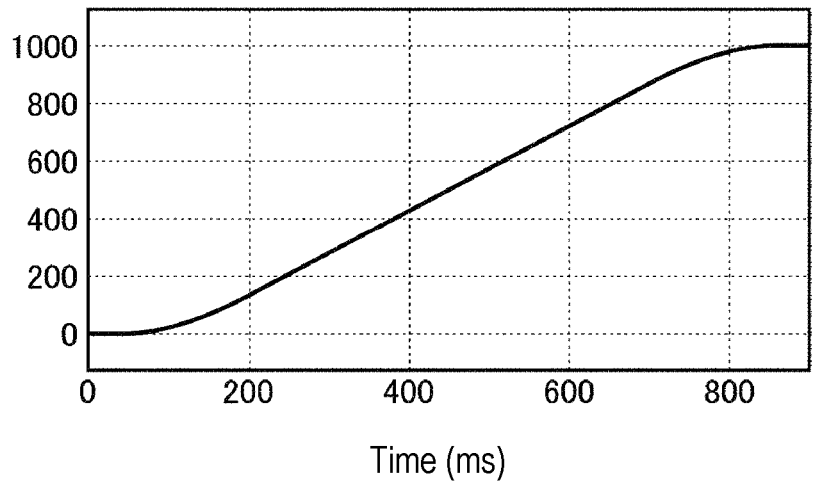
FIG. 5 illustrates one example of temporal change in a command position CX on the X-axis.
Figure 7:
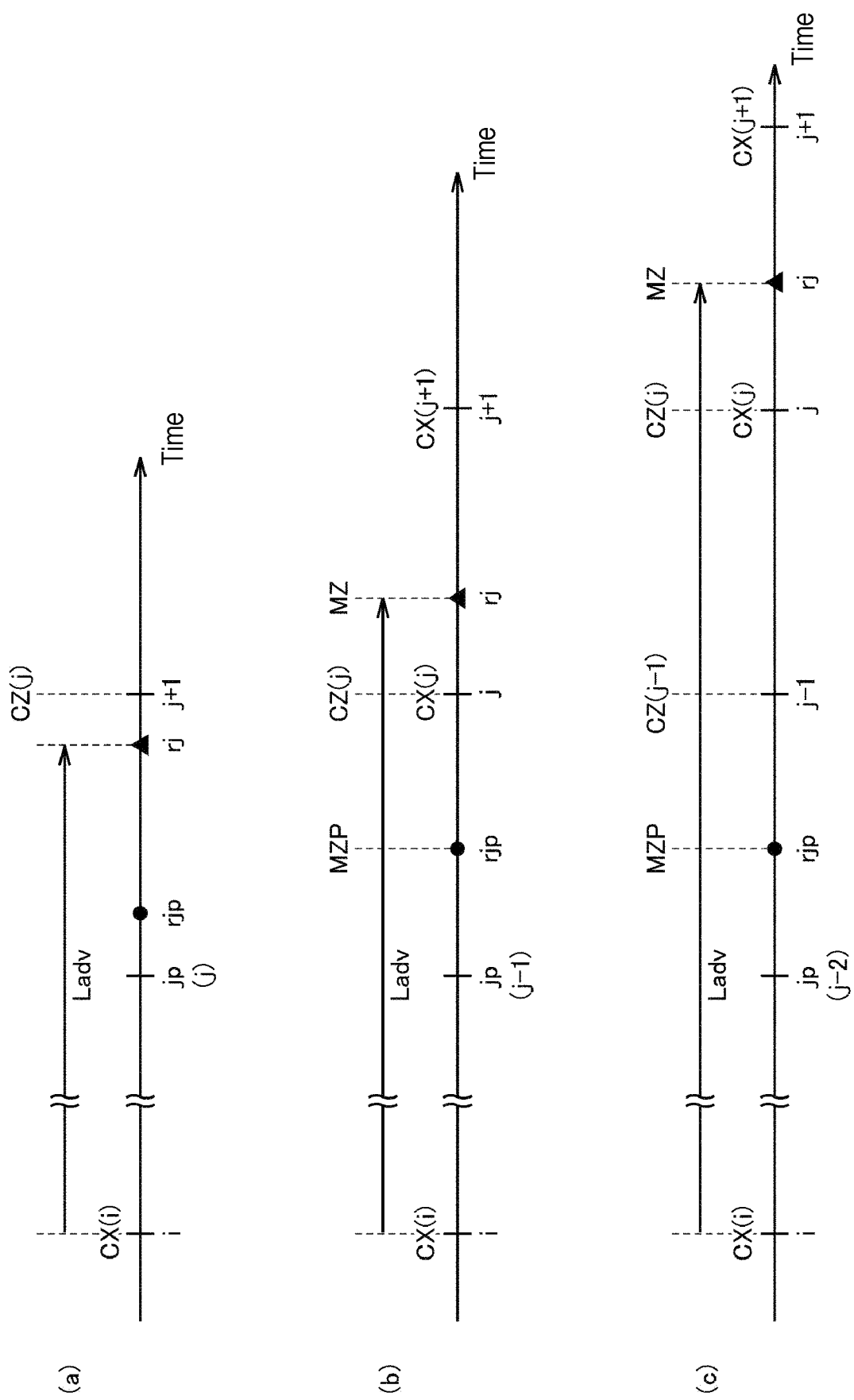
FIG. 7 describes a method for generating the command position CZ by interpolation calculation.
Figure 9:
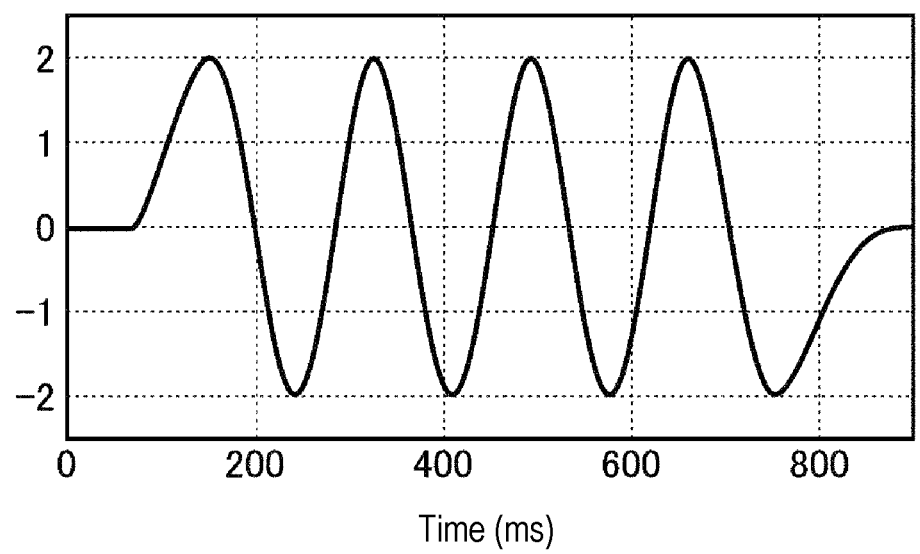
FIG. 9 illustrates one example of temporal change in the command position CZ on the Z-axis.

Referring to FIG. 4 to FIG. 9, a specific example of generation of the command position CZ is described. FIG. 4 illustrates one example of the surface shape of the workpiece W. FIG. 5 illustrates one example of temporal change in the command position CX on the X-axis. FIG. 6 illustrates one example of a source code of a program for generating the command position CZ on the Z-axis. FIG. 7 describes a method for generating the command position CZ by interpolation calculation. FIG. 8 illustrates one example of time series data of the command position CX on the X-axis, the calculated value MZ calculated from the measurement distance MD, and the command position CZ on the Z-axis. FIG. 9 illustrates one example of temporal change in the command position CZ on the Z-axis.

FIG. 4 shows the surface shape of the workpiece W having a length of 1000 mm in the X-axis direction. As shown in FIG. 4, the surface of the workpiece W is undulating in a wave-like manner along the X-axis direction.

In accordance with the target trajectory for moving a distance obtained by adding the advance distance Ladv to the length of 1000 mm of the workpiece W in the X-axis direction at a designated maximum speed and maximum acceleration/deceleration or less, the X-axis command generation module 140 generates the time series data of the command position CX for each control cycle. At this time, the command position CX of the 0th control cycle is set to a position (hereinafter taken as the origin on the X-axis) separated by the advance distance Ladv in the negative direction of the X-axis from the position of the coating head 304 when an endpoint of a line (hereinafter referred to as "projection line") obtained by projecting the X-axis on the surface of the workpiece W on the negative side of the X-axis is taken as the coating object point. When the coating head 304 is located at the origin of the X-axis, the measurement point of the measurement sensor 310 becomes the endpoint of the projection line on the negative side of the X-axis.

FIG. 5 shows temporal change in the command position CX when the advance distance Ladv is 10 mm, and a movement distance of 1010 mm, a maximum speed of 1500 mm/s, and a maximum acceleration/deceleration of ±10000 mm/s² are designated. At this time, a movement time is about 900 ms. FIG. 5 shows temporal change in the command position CX generated from the target trajectory in which, a fourth order trajectory is provided in a first period of 0 ms to 225 ms, a first order trajectory is provided in a second period of 225 ms to 675 ms, and a fourth order trajectory is provided in a third period of 675 ms to 900 ms. At a start point of 0 ms of the first period, a differential value of the fourth order trajectory is set to 0. At an end point of 900 ms of the third period, a differential value of the fourth order trajectory is set to 0. The slope of the fourth order trajectory at an end point of 200 ms of the first period is the same as the slope of the first order trajectory in the second period. The slope of the fourth order trajectory at a start point of 700 ms of the third period is the same as the slope of the first order trajectory in the second period. Accordingly, the coating head 304 smoothly moves in the X-axis direction. That is, the moving speed in the X-axis direction gradually increases in the first period, the moving speed in the X-axis direction becomes a constant speed (maximum speed) in the second period, and the moving speed in the X-axis direction gradually decreases in the third period.

In each control cycle in which the command position CX is generated that is on the negative side of the command position CX at the time when the coating object point reaches the endpoint of the projection line on the negative side of the X-axis, the Z-axis command generation module 150 generate the command position CZ indicating the origin on the Z-axis. The origin on the Z-axis is arbitrarily set.

In each control cycle after the coating object point has reached the endpoint of the projection line on the negative side of the X-axis, the Z-axis command generation module 150 generates the command position CZ in accordance with the source code shown in FIG. 6.

A program shown by the source code shown in FIG. 6 is executed every measurement cycle. Herein, an example is described in which the control cycle and the measurement cycle are the same. In FIG. 6, DNC indicates a maximum value of a control cycle number. For example, in the case where the X-axis command generation module 140 generates the command position CX of the 0th to 1000th control cycles in accordance with the target trajectory, DNC=1000 is set. i indicates the number of the present control cycle, and may take an integer of 0 to DNC. j indicates the number of a control cycle after the present control cycle, and may take an integer of i to DNC.

CX(i) indicates the command position CX of the present control cycle (i-th control cycle). CX(j) indicates the command position CX of the j-th control cycle. CX(i)+Ladv indicates a position separated by the advance distance Ladv in the positive direction of the X-axis from the position of the coating head 304 of the present control cycle, that is, the position of the coating head 304 when the measurement point in the present control cycle is set as the coating object point. In the second line of the source code shown in FIG. 6, the command positions CX(j) and CX(j+1) of two consecutive control cycles (j-th and j+1-th control cycles) are specified with the position of the coating head 304 when the measurement point of the present control cycle is set as the coating object point sandwiched therebetween.

In the third line of the source code shown in FIG. 6, time rj at which the coating object point of the coating head 304 reaches the measurement point of the present control cycle is calculated. The time rj indicates the time elapsed from a control start time, and is expressed by a numerical value being a real number multiple of the control cycle.

jp indicates the number of a control cycle corresponding to the command position CX closer to the command position CX of the 0th control cycle, among the command positions CX of two consecutive control cycles with the position of the coating head 304 when the measurement point of the previous control cycle is set as the coating object point sandwiched therebetween.

In the 5th to 7th lines of the source code shown in FIG. 6, a command position CZ(jj) of the jp+1-th to j-th control cycles is generated. jj may take an integer of jp+1 to j. Specifically, CZ(jj) is obtained by interpolation calculation in accordance with [Expression 2] below.

$$CZ(jj) = MZP + \frac{(MZ - MZP)}{(rj - rjp)} \times (jj - rjp) \qquad \text{[Expression 2]}$$

In [Expression 2], rjp indicates a time at which the coating object point of the coating head 304 reaches the measurement point of the previous control cycle. MZ is a value obtained by subtracting a desired clearance between the surface of the workpiece W and the coating head 304 from the measurement distance MD of the measurement sensor 310 in the present control cycle. MZP is a value obtained by subtracting the desired clearance from the measurement distance MD of the measurement sensor 310 in the previous control cycle. After the command position CZ(jj) is calculated, in the 9th to 11th lines of the source code shown in FIG. 6, j, rj, and MZ obtained in the present control cycle are changed to jp, rjp, and MZP, respectively. The jp, rjp, and MZP are used when the command position CZ(jj) is calculated in the next control cycle.

By executing the program shown by the source code shown in FIG. 6 every control cycle, the command position CZ of each control cycle is subjected to interpolation calculation.

(a) of FIG. 7 shows an example in which the moving speed in the X-axis direction in the present control cycle is slower than the moving speed in the X-axis direction in a future control cycle. In the example shown in (a) of FIG. 7, between the time rjp at which the coating object point of the coating head 304 reaches the measurement point of the previous control cycle and the time rj at which the coating object point reaches the measurement point of the present control cycle, a control cycle in which no command position CZ has been generated is not present. Hence, the command position CZ is not generated in the present control cycle.

(b) of FIG. 7 shows an example in which the moving speed in the X-axis direction in the present control cycle and the moving speed in the X-axis direction in a future control cycle are about the same. In the example shown in (b) of FIG. 7, between the time rjp at which the coating object point of the coating head 304 reaches the measurement point of the previous control cycle and the time rj at which the coating object point reaches the measurement point of the present control cycle, the j-th control cycle in which no command position CZ has been generated is present. Hence, the command position CZ(j) of the j-th control cycle is generated in the present control cycle.

(c) of FIG. 7 shows an example in which the moving speed in the X-axis direction in the present control cycle is faster than the moving speed in the X-axis direction in a future control cycle. In the example shown in (c) of FIG. 7, between the time rjp at which the coating object point of the coating head 304 reaches the measurement point of the previous control cycle and the time rj at which the coating object point reaches the measurement point of the present control cycle, the j-1-th and j-th control cycles in which no command position CZ has been generated are present. Hence, the command position CZ(j-1) of the j-1-th control cycle and the command position CZ(j) of the j-th control cycle are generated in the present control cycle.

FIG. 8 shows the command position CZ generated in accordance with the source code shown in FIG. 6. In the example shown in FIG. 8, the command position CX after the coating object point has reached the endpoint of the projection line on the negative side of the X-axis is generated in the 74th and subsequent control cycles. Therefore, the command position CZ until the 73rd control cycle is 0.

The 450th to 456th control cycles belong to the second period in which the moving speed in the X-axis direction is constant and maximum. In the example shown in FIG. 8, an increase in the command position CX in 6 control cycles is 9 mm, which is shorter than the advance distance Lady (=10 mm). Therefore, by setting the prediction horizon in the model predictive control within 6 control cycles, the command position CZ in the prediction horizon can be calculated by interpolation in accordance with the above [Expression 2].

On the other hand, if the prediction horizon is set to 7 control cycles or more, a measurement distance of the measurement point located on the positive side of the X-axis from the coating object point corresponding to the command position CX in the prediction horizon has not been obtained. Hence, the command position CZ in the prediction horizon cannot be calculated in accordance with the above [Expression 2]. In this case, the command position CZ in the prediction horizon may be generated by extrapolation using multiple calculated values MZ that are already obtained.

However, the accuracy of interpolation is higher than the accuracy of extrapolation. Hence, a distance from the command position CX of the present control cycle to the command position CX of the prediction horizon is preferably equal to or less than the advance distance Lady.

FIG. 9 shows a graph of the time series data of the command position CZ shown in FIG. 8. By moving the coating head 304 in the X-axis direction in accordance with the command position CX shown in FIG. 5, and moving the coating head 304 in the Z-axis direction in accordance with the command position CZ shown in FIG. 9, the coating head 304 moves in accordance with the surface shape of the workpiece W.

<E. Processing Procedure>

Figure 10:
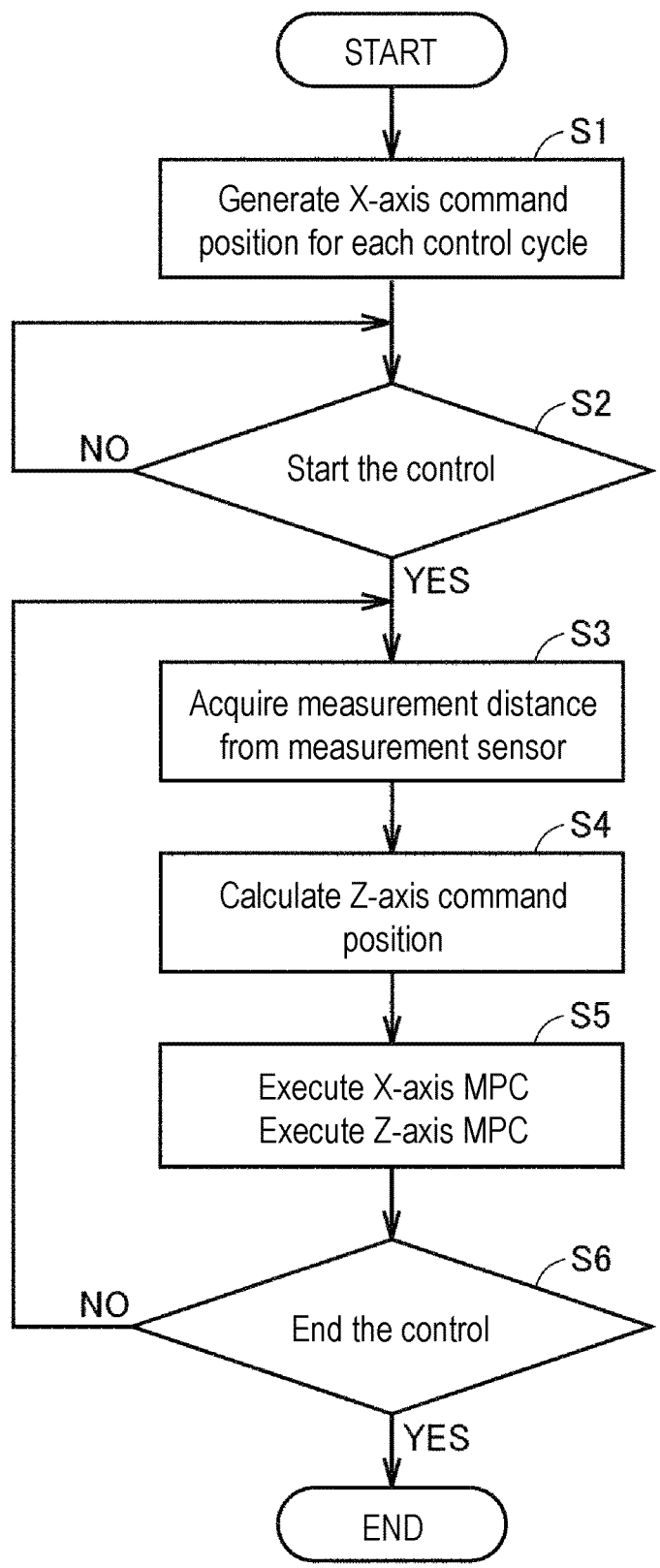
FIG. 10 is a flowchart showing a processing procedure of a control device according to the present embodiment.

Next, an outline of a processing procedure performed by the control device 100 according to the present embodiment is described. FIG. 10 is a flowchart showing a processing procedure of a control device according to the present embodiment. The steps shown in FIG. 10 may be realized by the processor 102 of the control device 100 executing a control program (including the system program 110 and the user program 112 shown in FIG. 2).

First, the control device 100 generates the command position CX for each control cycle in accordance with a predetermined target trajectory (step S1).

Next, the control device 100 determines whether to start the control (step S2). For example, the control device 100 may check the state of the servo drivers 200X and 200Z, the coating device 300 and other machines and receive a notification of completion of preparation from each machine, thereby determining to start movement control. If it is determined not to start the control (NO in step S2), the processing of the control device 100 is returned to step S2.

If it is determined to start the control (YES in step S2), the control device 100 acquires a measured value indicating a distance from the measurement sensor 310 to the surface of the workpiece W (step S3). The control device 100 generates the command position CZ using the measured value according to, for example, the source code shown in FIG. 6 (step S4).

In step S5, the control device 100 performs the model predictive control using the first dynamic characteristic model and the command position CX, and calculates the operation amount MVX to be output to the servo driver 200X. Further, in step S5, the control device 100 performs the model predictive control using the second dynamic characteristic model and the command position CZ, and calculates the operation amount MVZ to be output to the servo driver 200Z.

Next, the control device 100 determines whether the control should be ended (step S6). If the position of the coating head 304 reaches an end point of the target trajectory, the control device 100 may determine to end the control. If it is determined not to end the control (NO in step S6), the processing of the control device 100 is returned to step S3. Accordingly, steps S3 and S4 are repeated every control cycle. If a control cycle in which no command position CZ has been generated is not present between the time rjp at which the coating object point reaches the measurement point of the previous control cycle and the time rj at which the coating object point reaches the measurement point of the present control cycle, the processing (step S3) for generating the command position CZ is omitted.

If it is determined to end the control (YES in step S6), the processing of the control device 100 is ended.

<F. Simulation Result>

A simulation was performed to verify the effects of the control device 100 according to the present embodiment.

Figure 11:
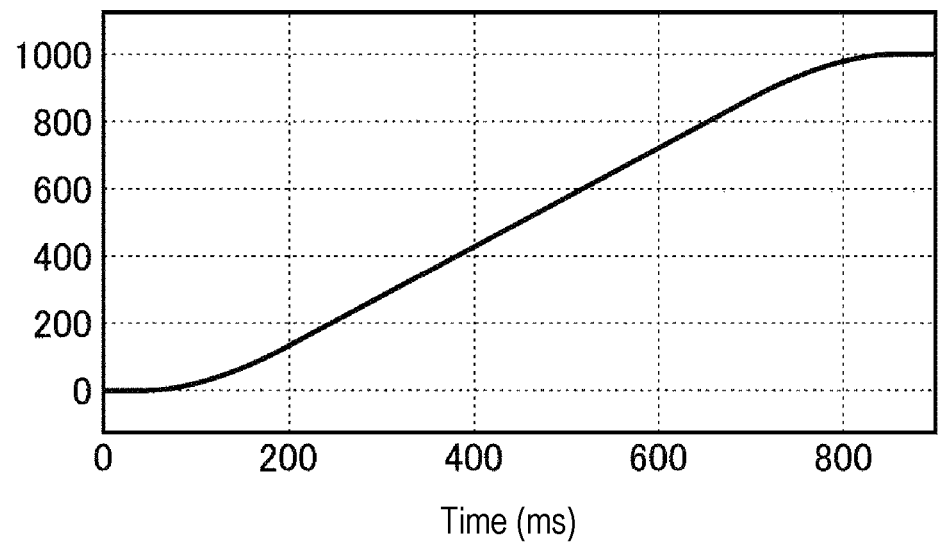
FIG. 11 illustrates temporal change in the command position CX according to a comparative example.

FIG. 11 illustrates temporal change in the command position CX according to a comparative example. FIG. 11 shows the command position CX that moves 1000 mm from one end to the other end of the workpiece W in the X-axis direction in about 900 ms, the workpiece W having the surface shape shown in FIG. 4. The command position CX is generated from the target trajectory in which, a fourth order trajectory is provided in the first period of 0 ms to 225 ms, a first order trajectory is provided in the second period of 225 ms to 675 ms, and a fourth order trajectory is provided in the third period of 675 ms to 900 ms.

Figure 12:
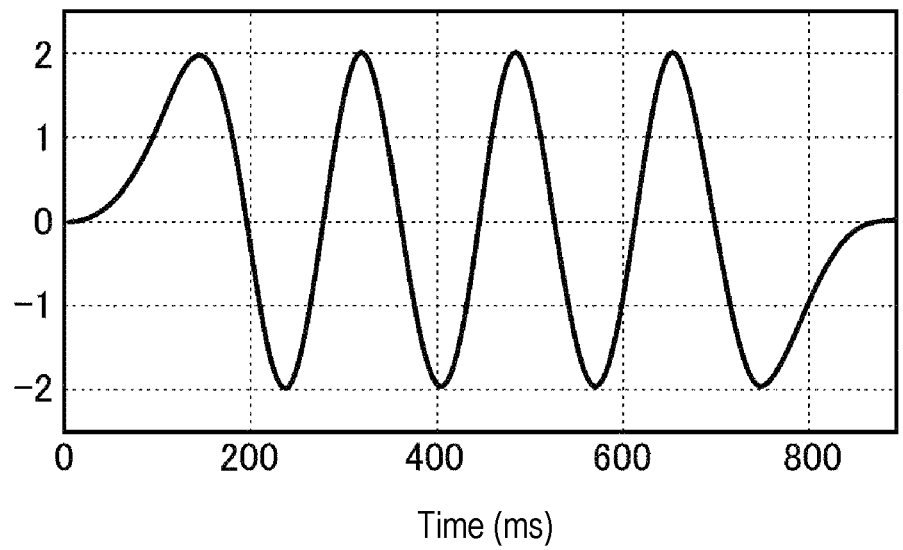
FIG. 12 illustrates temporal change in the command position CZ according to a comparative example.

FIG. 12 illustrates temporal change in the command position CZ according to a comparative example. The command position CZ of the example shown in FIG. 12 is generated based on the surface shape shown in FIG. 4 and the command position CX shown in FIG. 11.

Figure 13:
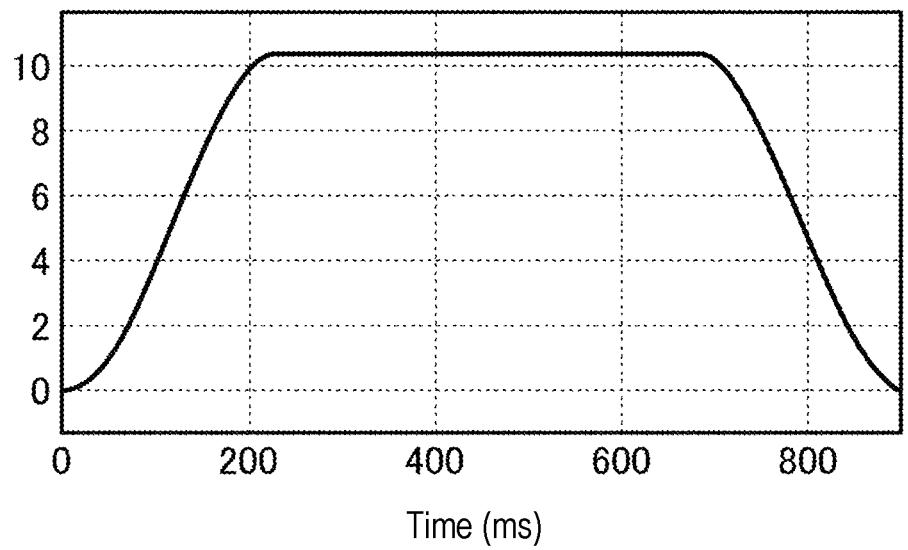
FIG. 13 illustrates an example of a simulation result when the command position CX shown in FIG. 11 is given as a command value to a servo driver 200X.
Figure 14:
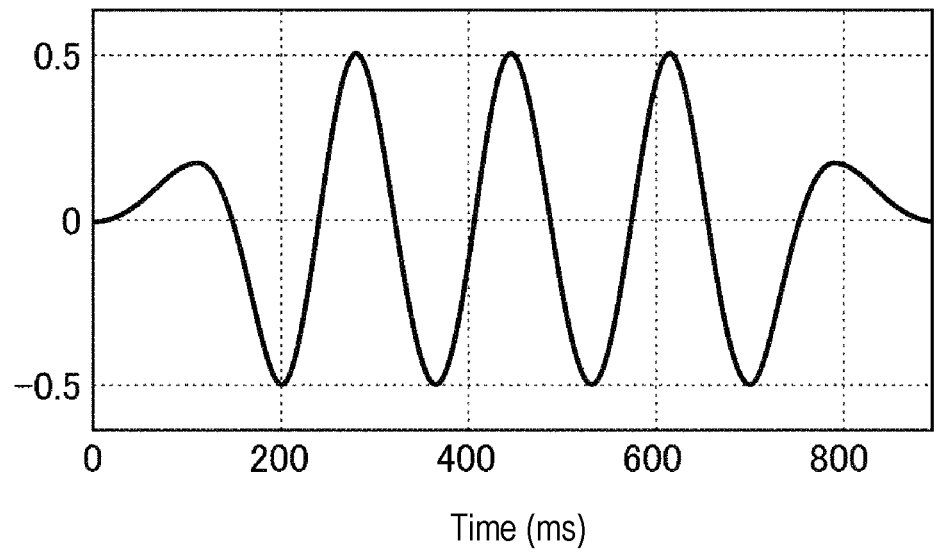
FIG. 14 illustrates an example of a simulation result when the command position CZ shown in FIG. 12 is given as a command value to a servo driver 200Z.

FIG. 13 illustrates an example of a simulation result when the command position CX shown in FIG. 11 is given as a command value to the servo driver 200X. FIG. 14 illustrates an example of a simulation result when the command position CZ shown in FIG. 12 is given as a command value to the servo driver 200Z.

Figure 15:
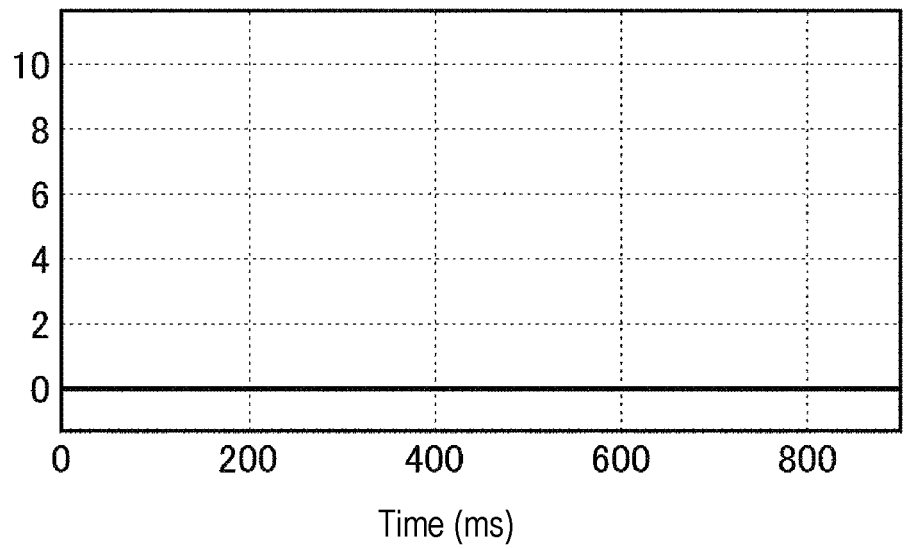
FIG. 15 illustrates an example of a simulation result when an operation amount MVX generated by model predictive control using the command position CX shown in FIG. 5 and a first dynamic characteristic model is given to the servo driver 200X.
Figure 16:
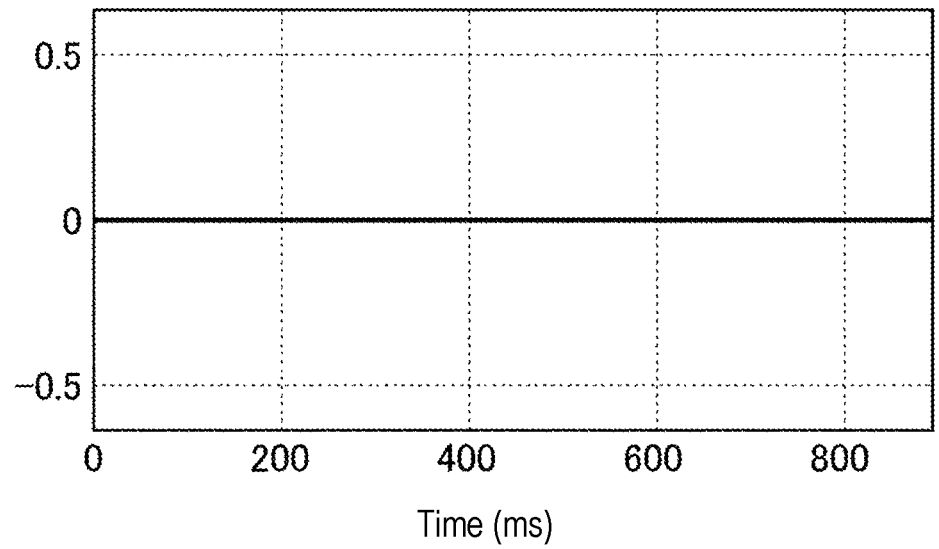
FIG. 16 illustrates an example of a simulation result when an operation amount MVZ generated by model predictive control using the command position CZ shown in FIG. 9 and a second dynamic characteristic model is given to the servo driver 200Z.

FIG. 15 illustrates an example of a simulation result when the operation amount MVX (here, indicating command speed) generated by the model predictive control using the command position CX shown in FIG. 5 and the first dynamic characteristic model is given to the servo driver 200X. FIG. 16 illustrates an example of a simulation result when the operation amount MVZ (here, indicating command speed) generated by the model predictive control using the command position CZ shown in FIG. 9 and the second dynamic characteristic model is given to the servo driver 200Z. FIG. 15 and FIG. 16 show the simulation results when the prediction horizon is set to 6 ms.

FIG. 13 to FIG. 16 show a deviation between a command position and an actual position of the coating head 304. As shown in FIG. 13 and FIG. 14, if a command position is directly given as a command value to a servo driver without performing model predictive control, the position deviation increases when the moving speed is high. In contrast, as shown in FIG. 15 and FIG. 16, it is confirmed that the position deviation becomes substantially 0 by performing model predictive control.

Figure 17:
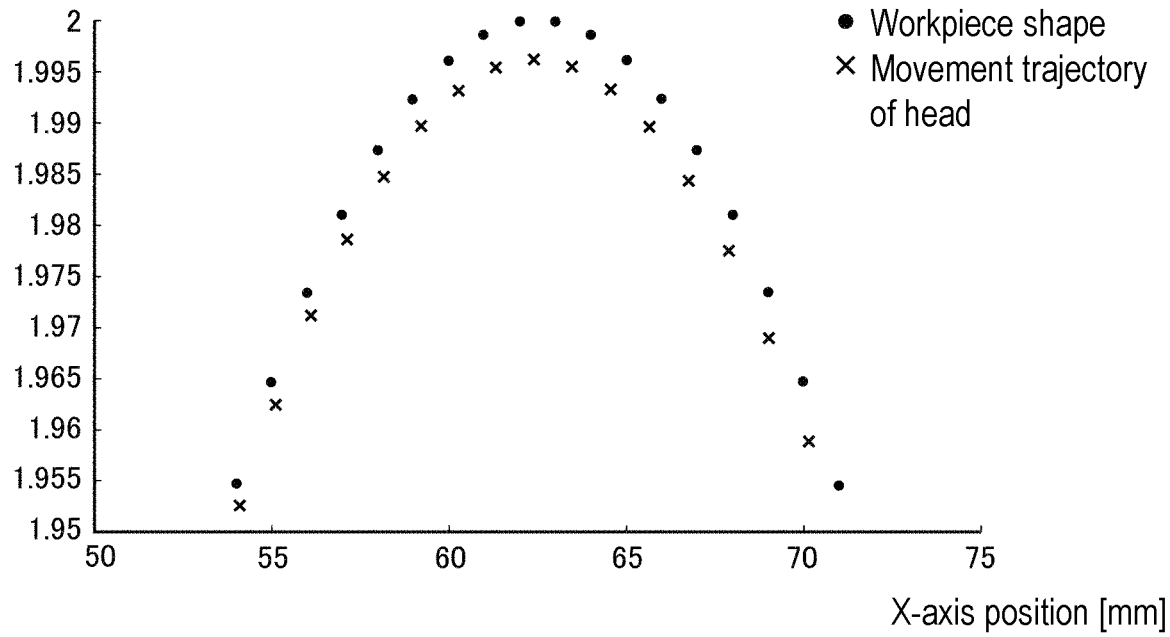
FIG. 17 illustrates a simulation result at X-axis positions of 50 mm to 75 mm in a movement trajectory of a coating head when the command positions shown in FIG. 11 and FIG. 12 are given as command values to the servo drivers.
Figure 18:
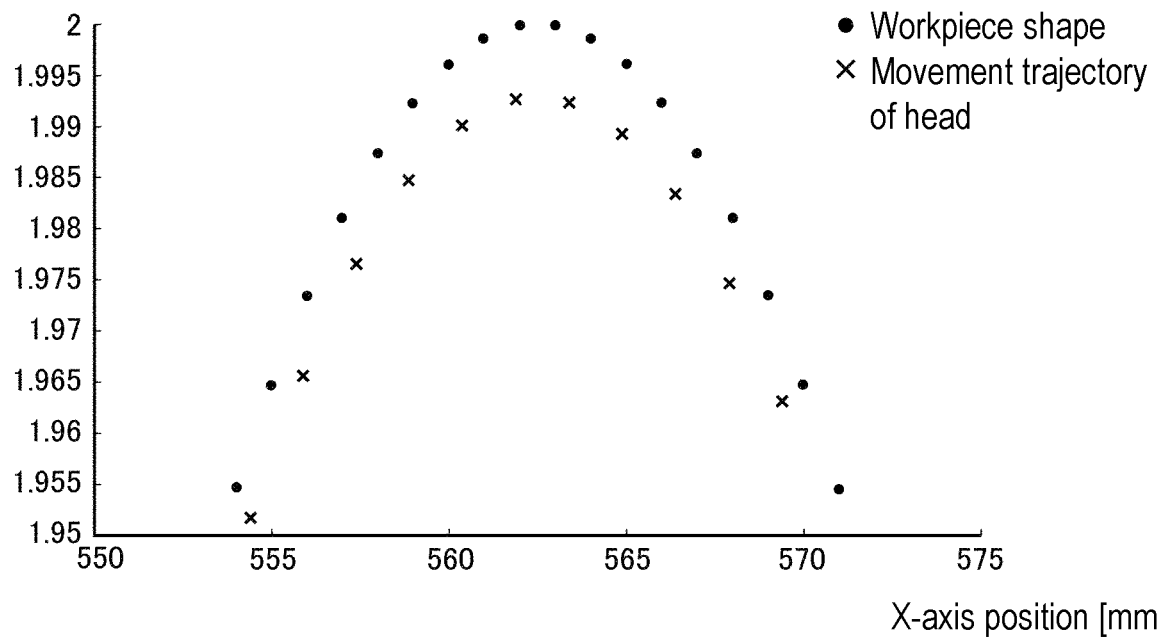
FIG. 18 illustrates a simulation result at X-axis positions of 550 mm to 575 mm in a movement trajectory of a coating head when the command positions shown in FIG. 11 and FIG. 12 are given as command values to the servo drivers.
Figure 19:
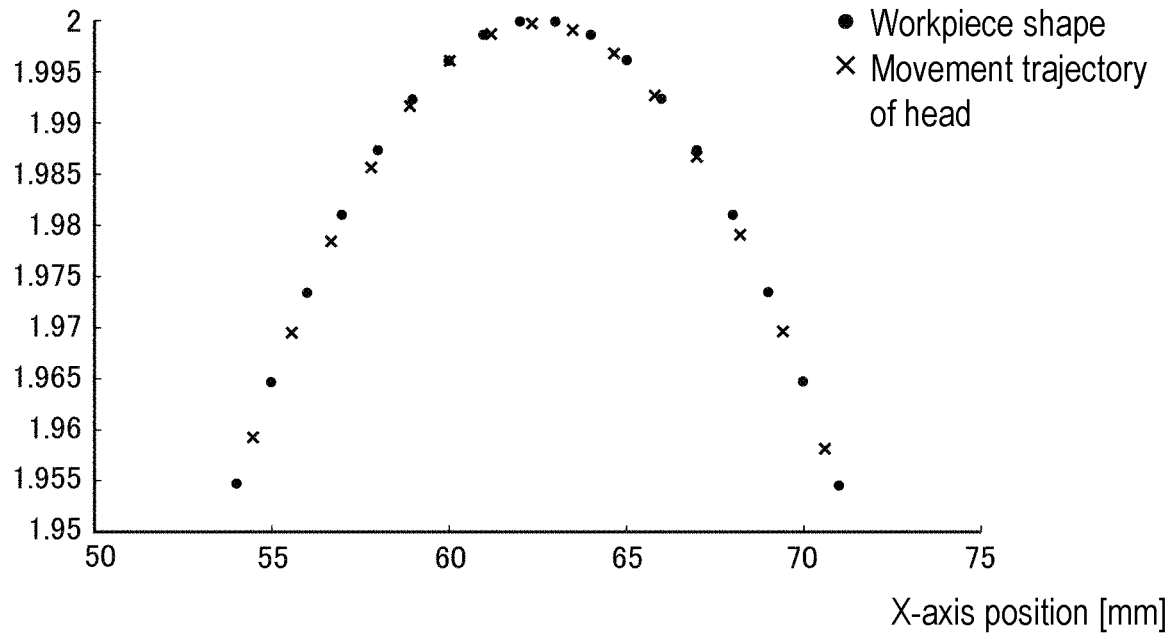
FIG. 19 illustrates a simulation result at X-axis positions of 50 mm to 75 mm in a movement trajectory of a coating head when an operation amount generated by model predictive control is given to a servo driver.
Figure 20:
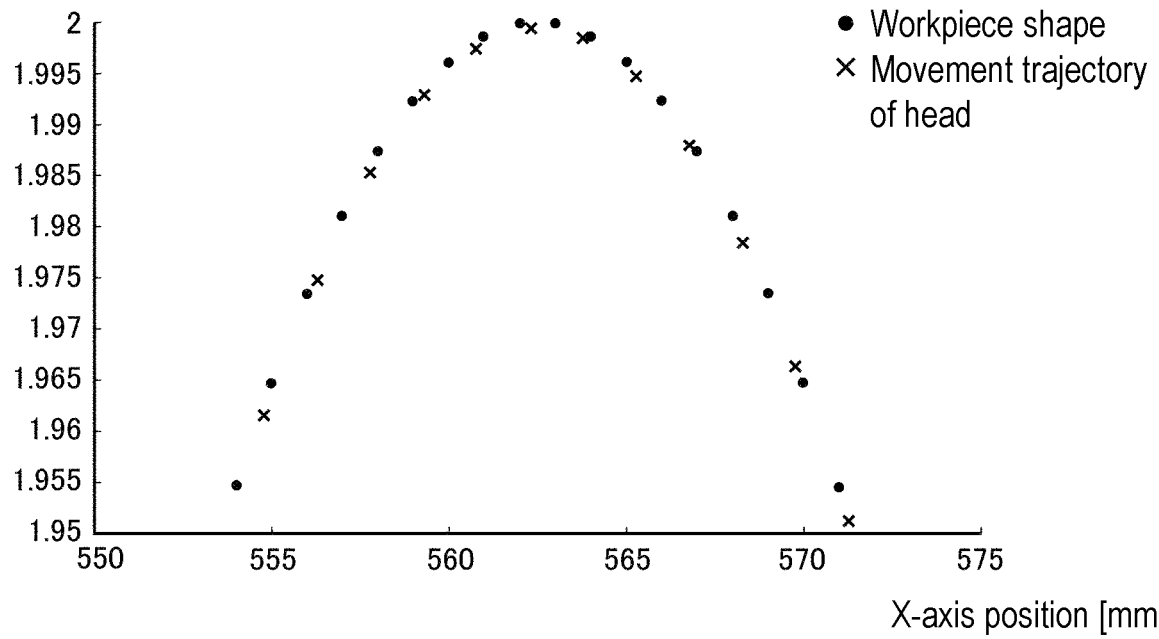
FIG. 20 illustrates a simulation result at X-axis positions of 550 mm to 575 mm in a movement trajectory of a coating head when an operation amount generated by model predictive control is given to a servo driver.

FIG. 17 illustrates a simulation result at X-axis positions of 50 mm to 75 mm in a movement trajectory of a coating head when the command positions shown in FIG. 11 and FIG. 12 are given as command values to the servo drivers 200X and 200Z. FIG. 18 illustrates a simulation result at X-axis positions of 550 mm to 575 mm in a movement trajectory of a coating head when the command positions shown in FIG. 11 and FIG. 12 are respectively given as command values to the servo drivers 200X and 200Z. FIG. 19 illustrates a simulation result at X-axis positions of 50 mm to 75 mm in a movement trajectory of a coating head when an operation amount generated by model predictive control is given to a servo driver. FIG. 20 illustrates a simulation result at X-axis positions of 550 mm to 575 mm in a movement trajectory of a coating head when an operation amount generated by model predictive control is given to a servo driver. FIG. 17 to FIG. 20 also show the shape of the workpiece W together with the movement trajectory of the coating head 304. A simulation was performed with the desired clearance between the surface of the workpiece W and the coating head 304 in the Z-axis direction as 0.

As shown in FIG. 17 and FIG. 18, if a command speed generated from a command position is directly given to a servo driver without performing model predictive control, there is a gap between the workpiece shape and the movement trajectory of the coating head 304. In contrast, as shown in FIG. 19 and FIG. 20, by performing model predictive control, the gap between the workpiece shape and the movement trajectory of the coating head 304 is significantly reduced, and the coating head 304 moves in accordance with the shape of the surface of the workpiece W.

<G. Advantages>

As described above, the control system 1 according to the present embodiment includes the coating head 304 serving as the control object, the measurement sensor 310, the multiple servo drivers 200 for moving the coating head 304, and the control device 100. The coating head 304 executes coating on the surface of the workpiece W. The measurement sensor 310 measures the distance to the measurement point on the surface of the workpiece W. The control device 100 outputs an operation account to the multiple servo drivers 200 every control cycle. The multiple servo drivers 200 include the servo driver 200X that moves the coating head 304 relative to the workpiece W along the target trajectory (here, the positive direction of the X-axis) on the XY plane facing the surface of the workpiece W, and the servo driver 200Z that moves the coating head 304 relative to the workpiece W along the Z-axis orthogonal to the XY plane. The measurement sensor 310 is integrated with the coating head 304 so that the position separated from the coating object point to be subjected to coating by the coating head 304 by the predetermined advance distance Lady in the positive direction of the X-axis serves as the measurement point. The control device 100 includes the X-axis command generation module 140, the Z-axis command generation module 150, and the model predictive control modules 142 and 152. Based on the target trajectory, the X-axis command generation module 140 generates the command position CX of the coating head 304 on the X-axis in each control cycle. By the model predictive control using the first dynamic characteristic model showing the relationship between the operation amount MVX and the position of the coating head 304 on the X-axis and the command position CX, the model predictive control module 142 generates the operation amount MVX. The Z-axis command generation module 150 generates the command position CZ of the coating head 304 on the Z-axis in each control cycle. By the model predictive control using the second dynamic characteristic model showing the relationship between the operation amount MVZ and the position of the coating head 304 on the Z-axis and the command position CZ, the model predictive control module 152 generates the operation amount MVZ. Based on the measurement result (measurement distance MD) of the measurement sensor 310 and the command position CX, the Z-axis command generation module 150 generates the command position CZ so that the distance between the coating head 304 and the surface of the workpiece W is constant.

The control device 100 of the above configuration performs movement control on the coating head 304 by model predictive control. At this time, the command position CZ on the Z-axis in each control cycle is generated based on the measurement distance MD. As a result, the coating head 304 is able to accurately follow the shape of the surface of the workpiece W.

The distance from the command position CX of the present control cycle to the command position CX of the control cycle belonging to the prediction horizon is preferably shorter than the advance distance Lady. Accordingly, the command position CZ in the prediction horizon can be calculated by interpolation in accordance with, for example, the above [Expression 2]. As a result, an error between the trajectory shape of the command position CZ and the surface shape of the workpiece W can be reduced, and by model predictive control, the coating head 304 is able to accurately follow the surface shape of the workpiece W.

The measurement sensor 310 measures the measurement distance MD every predetermined measurement cycle. The Z-axis command generation module 150, for a control cycle corresponding to the command position CZ located between the position of the coating head 304 when the measurement point in the previous measurement cycle is set as the coating object point and the position of the coating head 304 when the measurement point in the present measurement cycle is set as the coating object point, generates the command position CZ. Specifically, the Z-axis command generation module 150 generates the command position CZ by interpolation calculation using the measurement result (calculated value MZP) in the previous measurement cycle and the measurement result (calculated value MZ) in the present measurement cycle. Accordingly, the command position CZ can be accurately calculated by interpolation in accordance with, for example, the above [Expression 2].

<H. Modifications>
<H-1. First Modification>

In the above description, it is assumed that the coating device 300 includes the servomotor 320X that moves the coating head 304 relative to the workpiece W along the X-axis on the XY plane facing the surface of the workpiece W. However, the coating device 300 may include, instead of the servomotor 320X, a servomotor that rotates the coating head 304 along the XY plane about a reference axis orthogonal to the XY plane. In this case, the measurement sensor 310 is integrated with the coating head 304 so that a position separated from the coating object point by the predetermined advance distance Lady in the rotation direction serves as the measurement point. The control system 1 includes, instead of the servo driver 200X, a servo driver that drives the aforesaid servomotor. Further, the control device 100 may include, instead of the X-axis command generation module 140, a command generation module that generates a command angle with respect to the reference axis. The control device 100 may include, instead of the model predictive control module 142, a model predictive control module that generates an operation amount to be output to a servo driver by model predictive control using a dynamic characteristic model showing a relationship between the operation amount and a rotation position of the coating head 304 and the command angle.

<H-2. Second Modification>

In the above description, it is assumed that in the coating device 300, the coating head 304 is moved only along the X-axis on the XY plane facing the surface of the workpiece W. However, the coating device 300 may further include a servomotor that moves the coating head 304 along the Y-axis on the XY plane facing the surface of the workpiece W.

Figure 21:
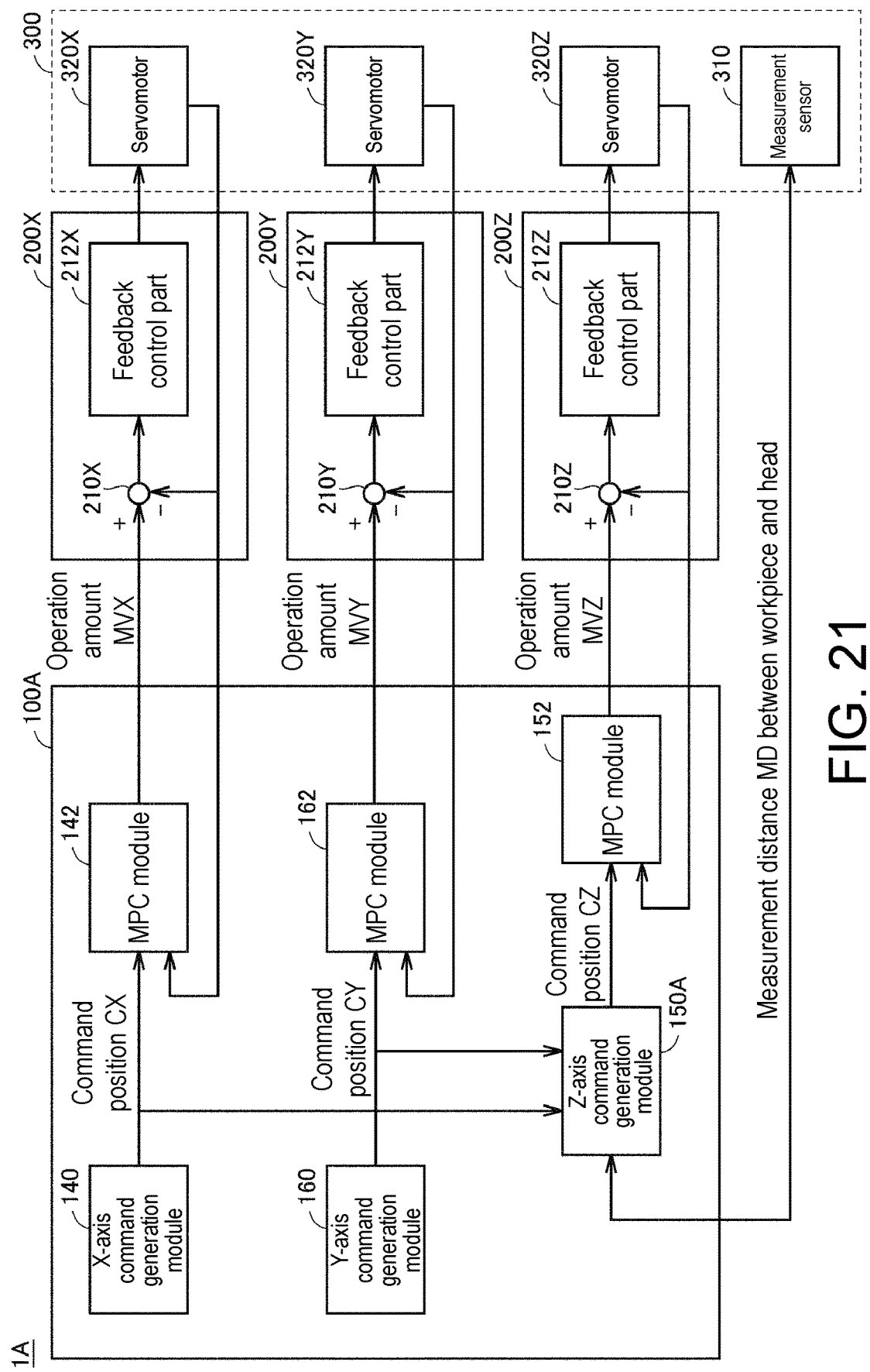
FIG. 21 is a schematic diagram showing one example of a functional configuration of a control system according to a second modification.

FIG. 21 is a schematic diagram showing one example of a functional configuration of a control system according to the second modification. As shown in FIG. 21, the coating device 300 includes a servomotor 320Y in addition to the servomotors 320X and 320Z. The servomotor 320Y moves the coating head 304 (see FIG. 1) in a Y-axis direction. Accordingly, the coating head 304 moves relative to the workpiece W along the Y-axis direction.

The measurement sensor 310 is integrated with the coating head 304 so as to measure the measurement point ahead of the coating object point by the advance distance Lady in a traveling direction of the coating head 304.

A control system 1A according to the second modification includes, in addition to the servo drivers 200X and 200Z, a servo driver 200Y for driving the servomotor 320Y.

The servo driver 200Y includes a subtractor 210Y and a feedback control part 212Y. The subtractor 210Y receives an operation amount MVY as the command value (command position or command speed) from a control device 100A, and also receives an output signal as the feedback value from an encoder coupled to the servomotor 320Y. The subtractor 210Y calculates a deviation between the command value and the feedback value. Similarly to the feedback control parts 212X and 212Z, the feedback control part 212Y executes a control operation according to the deviation output from the subtractor 210Y.

The control system 1A according to the second modification includes the control device 100A instead of the control device 100. Compared to the control device 100, the control device 100A includes a Z-axis command generation module 150A instead of the Z-axis command generation module 150, and differs from the control device 100 by further including a Y-axis command generation module 160 and a model predictive control module 162.

The Y-axis command generation module 160 generates a third command position (hereinafter referred to as "command position CY") of the coating head 304 on the Y-axis for each control cycle in accordance with the target trajectory that is created in advance. The Y-axis command generation module 160 outputs the generated command position CY to the model predictive control module 162.

The Y-axis command generation module 160 generates time series data of the command position CY from the target trajectory, and reads the command position CY for each control cycle from the time series data. Alternatively, the control device 100A may store in advance the time series data of the command position CY that define the target trajectory. In this case, the Y-axis command generation module 160 may access the time series data of the command position CY stored in advance. In this way, the command position CY for each control cycle may be sequentially calculated from the target trajectory in accordance with a predetermined calculation formula, or may be stored in advance in the form of time series data.

By model predictive control using a third dynamic characteristic model showing a relationship between the operation amount MVY and the position of the coating head 304 on the Y-axis and the command position CY, the model predictive control module 162 generates the operation amount MVY to be output to the servo driver 200Y. The third dynamic characteristic model is created by the same method as the first dynamic characteristic model.

Based on the measurement distance MD from the measurement sensor and the command positions CX and CY, the Z-axis command generation module 150A generates the command position CZ for each control cycle so that the distance between the coating head 304 and the surface of the workpiece W is constant.

Figure 22:
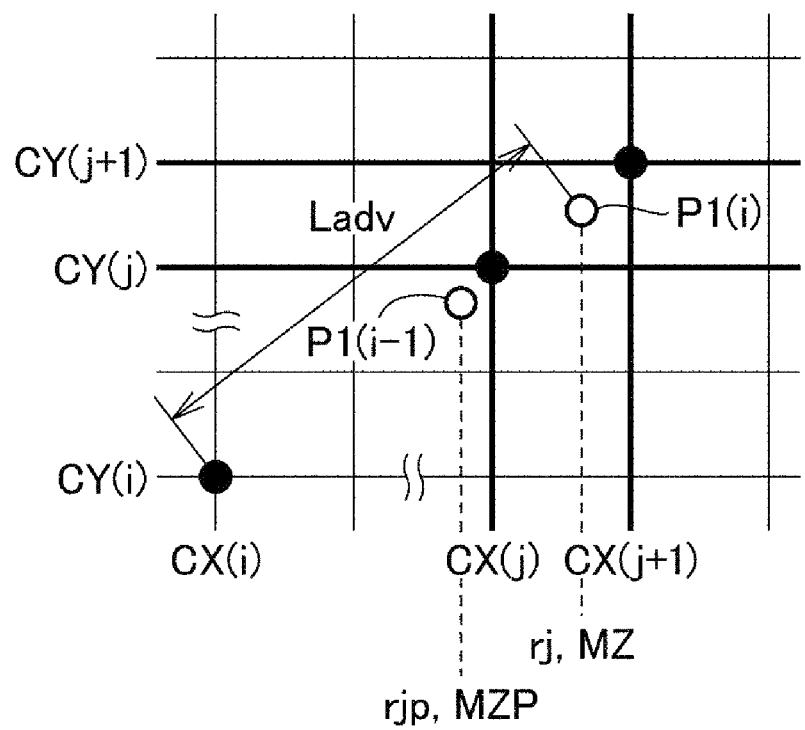
FIG. 22 describes a method for generating the command position CZ in the second modification.

FIG. 22 describes a method for generating the command position CZ in the second modification. The Z-axis command generation module 150A specifies the command positions (CX(j), CY(j)) and (CX(j+1), CY(j+1)) of two consecutive control cycles (j-th and j+1-th control cycles) with a virtual position P1(i) of the coating head 304 when the measurement point of the present control cycle is set as the coating object point sandwiched therebetween. The virtual position P1(i) of the present control cycle i is a position ahead of the command position (CX(i), CY(i)) in the present control cycle i by the advance distance Lady in the traveling direction.

By interpolation calculation using the virtual position P1(i) and the command positions (CX(j), CY(j)) and (CX(j+1), CY(j+1)), the Z-axis command generation module 150A calculates the time rj when the coating head 304 reaches the virtual position P1(i). The time rj indicates the time elapsed from the control start time, and is expressed by a numerical value being a real number multiple of the control cycle. An ideal position of the coating head 304 on the Z-axis at the time rj is the calculated value MZ obtained by subtracting the desired clearance from the measurement distance MD of the present control cycle.

In the case where an integer time (that is, a time at which an integral multiple of the control cycle has elapsed from the control start time) is present between the time rjp at which the coating object point of the coating head 304 reaches the measurement point of the previous control cycle and the time rj, the command position CZ of the control cycle corresponding to the integer value is calculated. In the example shown in FIG. 22, the command position CZ(j) of the j-th control cycle is generated. The command position CZ(j) is obtained by interpolation calculation in accordance with the above [Expression 2] using the time rjp, the time rj and the calculated values MZP and MZ. The calculated value MZP is a value obtained by subtracting the desired clearance from the measurement distance MD of the previous control cycle.

<H-3. Third Modification>

In the above description, it is assumed that the measurement cycle is the same as the control cycle. However, the measurement cycle may be shorter than the control cycle. For example, the measurement cycle may be 0.1 ms, and the control cycle may be 1 ms. In this case, the command positions CX and CZ and the calculated value MZ shown in FIG. 8 are obtained every measurement cycle. Accordingly, accuracy of the interpolation calculation can be improved, and an error between the movement trajectory of the coating head 304 and the surface shape of the workpiece W can further be reduced. The model predictive control modules 142 and 152 may perform model predictive control using the command positions CX and CZ respectively for each control cycle.

<H-4. Fourth Modification>

In the above description, it is assumed that the multiple servo drivers 200 move the coating head 304. However, the multiple servo drivers 200 may change the relative positional relationship between the workpiece W and the coating head 304. The multiple servo drivers 200 may be configured to move the workpiece W with the coating head 304 fixed. For example, the workpiece W may be placed on an XZ stage. In this case, the servo driver 200X moves the coating head 304 relative to the workpiece W along the X-axis direction by controlling movement of the XZ stage in the X-axis direction. The servo driver 200Z moves the coating head 304 relative to the workpiece W along the Z-axis direction by controlling movement of the XZ stage in the Z-axis direction. Alternatively, the workpiece W may be placed on an XYZ stage. In this case, the servo driver 200Y moves the coating head 304 relative to the workpiece W along the Y-axis direction by controlling movement of the XYZ stage in the Y-axis direction.

Alternatively, the servo driver 200X may control movement of one (for example, the coating head 304) of the coating head 304 and the workpiece W in the X-axis direction, and the servo driver 200Z may control movement of the other (for example, the workpiece W) of the coating head 304 and the workpiece W in the Z-axis direction. Further, the servo driver 200Y may control movement of either of the coating head 304 and the workpiece W in the Y-axis direction.

<I. Additional Remark>

As stated above, the present embodiment and the modifications include the following disclosures.

(Configuration 1)

A control system (1, 1A), including:

a control object (304), executing a predetermined processing on a surface of an object (W);

a measurement sensor (310), measuring a distance to a measurement point on the surface of the object (W);

multiple drive devices (200), for changing a relative positional relationship between the object (W) and the control object (304); and a control device (100, 100A), outputting an operation amount to the multiple drive devices (200) every control cycle, wherein the multiple drive devices (200) include:

a first drive device (200X), for moving the control object (304) relative to the object (W) along a target trajectory on a plane facing the surface of the object (W), and a second drive device (200Z), for moving the control object (304) relative to the object (W) along an orthogonal axis orthogonal to the plane;

the measurement sensor (310) is integrated with the control object (304) so that a position separated by a predetermined distance along the target trajectory from a processing object point to be subjected to the predetermined processing by the control object (304) serves as the measurement point;

the control device (100, 100A) includes:

a first generator (140), generating a first command position of the control object (304) on the plane in each control cycle based on the target trajectory, a first control part (142), generating a first operation amount output to the first drive device (200X) by model predictive control using a first dynamic characteristic model showing a relationship between the first operation amount and a position of the control object (304) on the plane and the first command position, a second generator (150, 150A), generating a second command position of the control object (304) on the orthogonal axis in each control cycle, and a second control part (152), generating a second operation amount output to the second drive device (200Z) by model predictive control using a second dynamic characteristic model showing a relationship between the second operation amount and a position of the control object (304) on the orthogonal axis and the second command position, wherein based on a measurement result of the measurement sensor (310) and the first command position, the second generator (150, 150A) generates the second command position so that a distance between the control object (304) and the surface of the object (W) is constant.

(Configuration 2)

The control system (1, 1A) as described in Configuration 1, wherein a distance from the first command position of a present control cycle to the first command position of a control cycle belonging to a prediction horizon is shorter than the predetermined distance.

(Configuration 3)

The control system (1) as described in Configuration 1 or 2, wherein the measurement sensor (310) measures the distance every predetermined measurement cycle;

the second generator (150), for a control cycle corresponding to the first command position located between the position of the control object (304) on the plane when the measurement point in a previous measurement cycle is set as the processing object point and the position of the control object (304) on the plane when the measurement point in a present measurement cycle is set as the processing object point, generates the second command position by interpolation calculation using a measurement result in the previous measurement cycle and a measurement result in the present measurement cycle.

(Configuration 4)

The control system (1, 1A) as described in Configuration 3, wherein the measurement cycle is shorter than the control cycle.

(Configuration 5)

The control system (1A) as described in Configuration 1, wherein the first drive device (200X) moves the control object (304) relative to the object (W) along a first axis on the plane;

the first command position indicates a position on the first axis;

the first dynamic characteristic model indicates a relationship between the first operation amount and the position of the control object (304) on the first axis;

the multiple drive devices (200) further include a third drive device (200Y) for moving the control object (304) relative to the object (W) along a second axis on the plane that is different from the first axis;

the control device (100A) further includes:

a third generator (160), generating a third command position of the control object (304) on the second axis in each control cycle based on the target trajectory, and a third control part (162), generating a third operation amount output to the third drive device (200Y) by model predictive control using a third dynamic characteristic model showing a relationship between the third operation amount and the position of the control object (304) on the second axis and the third command position, wherein the second generator (150A) generates the second command position based on the third command position in addition to the measurement result of the measurement sensor (310) and the first command position.

(Configuration 6)

A control program (110, 112) for realizing a control device (100, 100A) of a control system (1, 1A), the control system (1, 1A) including:

a control object (304), executing a predetermined processing on a surface of an object (W);

a measurement sensor (310), measuring a distance to a measurement point on the surface of the object (W);

multiple drive devices (200), for changing a relative positional relationship between the object (W) and the control object (304); and the control device (100, 100A), outputting an operation amount to the multiple drive devices (200) every control cycle, wherein the multiple drive devices (200) include:

a first drive device (200X), for moving the control object (304) relative to the object (W) along a target trajectory on a plane facing the surface of the object (W), and a second drive device (200Z), for moving the control object (304) relative to the object (W) along an orthogonal axis orthogonal to the plane;

the measurement sensor (310) is integrated with the control object (304) so that a position separated by a predetermined distance along the target trajectory from a processing object point to be subjected to the predetermined processing by the control object (304) serves as the measurement point;

wherein the control program (110, 112) includes:

a step of generating a first command position of the control object (304) on the plane in each control cycle based on the target trajectory;

a step of generating a first operation amount output to the first drive device (200X) by model predictive control using a first dynamic characteristic model showing a relationship between the first operation amount and a position of the control object (304) on the plane and the first command position;

a step of generating a second command position of the control object (304) on the orthogonal axis in each control cycle; and a step of generating a second operation amount output to the second drive device (200Z) by model predictive control using a second dynamic characteristic model showing a relationship between the second operation amount and a position of the control object (304) on the orthogonal axis and the second command position, wherein the step of generating the second command position includes a step of, based on a measurement result of the measurement sensor (310) and the first command position, generating the second command position so that a distance between the control object (304) and the surface of the object (W) is constant.

Although the embodiments of the present invention have been described, the embodiments disclosed herein are illustrative in all aspects and should not be construed as being restrictive. The scope of the present invention is indicated by claims, and it is intended to include all modifications within the scope of the claims and the equivalents thereof.

DESCRIPTION OF REFERENCE NUMERALS 1, 1A: control system; 2: stage; 100, 100A: control device; 101a, 101b: fieldbus; 102: processor; 104: chipset; 106: main memory; 108: flash memory; 110: system program; 112: user program; 112A: sequence program; 112B: motion program; 116: external network controller; 118: memory card interface; 120: memory card; 122, 124: fieldbus controller; 140: X-axis command generation module; 142, 152, 162: model predictive control module; 150, 150A: Z-axis command generation module; 160: Y-axis command generation module; 200, 200X, 200Y, 200Z: servo driver; 210X, 210Y, 210Z: subtractor; 212X, 212Y, 212Z: feedback control part; 300: coating device; 302: main body; 304: coating head; 306, 308: connection part; 310: measurement sensor; 320X, 320Y, 320Z: servomotor; W: workpiece.

What is claimed is:

1. A control system, comprising:
a control object, executing a predetermined processing on a surface of an object;
a measurement sensor, measuring a distance to a measurement point on the surface of the object;
a plurality of drive devices, for changing a relative positional relationship between the object and the control object; and
a control device, outputting an operation amount to the plurality of drive devices every control cycle, wherein
the plurality of drive devices comprise:
    a first drive device, for moving the control object relative to the object along a target trajectory on a plane facing the surface of the object, and
    a second drive device, for moving the control object relative to the object along an orthogonal axis orthogonal to the plane;
the measurement sensor is integrated with the control object so that a position separated by a predetermined distance along the target trajectory from a processing object point on the surface of the object to be subjected to the predetermined processing by the control object serves as the measurement point;
the control device comprises:
    a first generator, generating a first command position of the control object on the plane in each control cycle based on the target trajectory,
    a first control part, generating a first operation amount output to the first drive device by model predictive control using a first dynamic characteristic model showing a relationship between the first operation amount and a position of the control object on the plane and the first command position,
    a second generator, generating a second command position of the control object on the orthogonal axis in each control cycle, and
    a second control part, generating a second operation amount output to the second drive device by model predictive control using a second dynamic characteristic model showing a relationship between the second operation amount and a position of the control object on the orthogonal axis and the second command position, wherein
based on a measurement result of the measurement sensor and the first command position, the second generator generates the second command position so that a distance between the control object and the surface of the object is constant.

2. The control system according to claim 1, wherein a distance from the first command position of a present control cycle to the first command position of a control cycle belonging to a prediction horizon is shorter than the predetermined distance.

3. The control system according to claim 1, wherein
the measurement sensor measures the distance every predetermined measurement cycle;
the second generator, for a control cycle corresponding to the first command position located between the position of the control object on the plane when the measurement point in a previous measurement cycle is set as the processing object point and the position of the control object on the plane when the measurement point in a present measurement cycle is set as the processing object point, generates the second command position by interpolation calculation using a measurement result in the previous measurement cycle and a measurement result in the present measurement cycle.

4. The control system according to claim 3, wherein the measurement cycle is shorter than the control cycle.

5. The control system according to claim 1, wherein
the first drive device moves the control object relative to the object along a first axis on the plane;
the first command position indicates a position on the first axis;
the first dynamic characteristic model indicates a relationship between the first operation amount and the position of the control object on the first axis;
the plurality of drive devices further comprise a third drive device for moving the control object relative to the object along a second axis on the plane that is different from the first axis;
the control device further comprises:
a third generator, generating a third command position of the control object on the second axis in each control cycle based on the target trajectory, and
a third control part, generating a third operation amount output to the third drive device by model predictive control using a third dynamic characteristic model showing a relationship between the third operation amount and the position of the control object on the second axis and the third command position, wherein
the second generator generates the second command position based on the third command position in addition to the measurement result of the measurement sensor and the first command position.

6. A non-transitory computer readable recording medium storing a control program for realizing a control device of a control system, the control system comprising:
a control object, executing a predetermined processing on a surface of an object;
a measurement sensor, measuring a distance to a measurement point on the surface of the object;

a plurality of drive devices, for changing a relative positional relationship between the object and the control object; and the control device, outputting an operation amount to the plurality of drive devices every control cycle, wherein the plurality of drive devices comprise:
- a first drive device, for moving the control object relative to the object along a target trajectory on a plane facing the surface of the object, and
- a second drive device, for moving the control object relative to the object along an orthogonal axis orthogonal to the plane;

the measurement sensor is integrated with the control object so that the measurement point is located in a position separated by a predetermined distance along the target trajectory from a processing object point on the surface of the object to be subjected to the predetermined processing by the control object;

wherein the control program causes a computer to execute:

generating a first command position of the control object on the plane in each control cycle based on the target trajectory;

generating a first operation amount output to the first drive device by model predictive control using a first dynamic characteristic model showing a relationship between the first operation amount and a position of the control object on the plane and the first command position;

generating a second command position of the control object on the orthogonal axis in each control cycle; and generating a second operation amount output to the second drive device by model predictive control using a second dynamic characteristic model showing a relationship between the second operation amount and a position of the control object on the orthogonal axis and the second command position, wherein generating the second command position comprises, based on a measurement result of the measurement sensor and the first command position, generating the second command position so that a distance between the control object and the surface of the object is constant.

7. The control system according to claim 2, wherein the measurement sensor measures the distance every predetermined measurement cycle;

the second generator, for a control cycle corresponding to the first command position located between the position of the control object on the plane when the measurement point in a previous measurement cycle is set as the processing object point and the position of the control object on the plane when the measurement point in a present measurement cycle is set as the processing object point, generates the second command position by interpolation calculation using a measurement result in the previous measurement cycle and a measurement result in the present measurement cycle.

* * * * *